(12) United States Patent
Chang et al.

(10) Patent No.: US 12,035,181 B2
(45) Date of Patent: Jul. 9, 2024

(54) WIRELESS NETWORK COMMUNICATIONS METHOD, BASE STATION, TERMINAL, AND COMMUNICATIONS APPARATUS

(71) Applicant: HUAWEI TECHNOLOGIES CO., LTD., Guangdong (CN)

(72) Inventors: Junren Chang, Beijing (CN); Jun Wang, Shanghai (CN); Xiao Xiao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 17/351,400

(22) Filed: Jun. 18, 2021

(65) Prior Publication Data

US 2021/0314830 A1    Oct. 7, 2021

Related U.S. Application Data

(63) Continuation of application No. PCT/CN2019/124200, filed on Dec. 10, 2019.

(30) Foreign Application Priority Data

Dec. 20, 2018 (CN) .......................... 201811561864.5

(51) Int. Cl.
*H04W 36/00* (2009.01)
*H04W 92/18* (2009.01)

(52) U.S. Cl.
CPC ... *H04W 36/0058* (2018.08); *H04W 36/0009* (2018.08); *H04W 36/0072* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2017/0257803 | A1 | 9/2017 | Tenny et al. |
| 2018/0049084 | A1 | 2/2018 | Lee et al. |

(Continued)

FOREIGN PATENT DOCUMENTS

| | | | |
|---|---|---|---|
| CN | 106998575 A | 8/2017 | |
| CN | 107295454 A | 10/2017 | |

(Continued)

OTHER PUBLICATIONS

R2-162290, Huawei et al., Sidelink resource configuration during handover, 3GPP TSG-RAN WG2 #93bis, Dubrovnik, Croatia, Apr. 11-15, 2016, total 3 pages.

(Continued)

*Primary Examiner* — Diane L Lo

(57) ABSTRACT

A first base station determines that a first terminal in a first cell is handed over to a second cell, where the first terminal belongs to a group of terminals, and the first cell belongs to the first base station. The first base station sends first information to the first terminal, where the first information indicates a first sidelink resource used by the group of terminals to perform communication, and the first sidelink resource is valid in both the first cell and the second cell. The foregoing technical solution resolves a problem that is of communications resource configuration of a group of terminals and that exists when the group of terminals perform handover.

18 Claims, 8 Drawing Sheets

(56) References Cited

U.S. PATENT DOCUMENTS

| | | | |
|---|---|---|---|
| 2018/0124656 A1 | 5/2018 | Park et al. | |
| 2018/0227813 A1 | 8/2018 | Tenny et al. | |
| 2019/0028947 A1* | 1/2019 | Adachi | H04W 76/11 |
| 2019/0037449 A1* | 1/2019 | Fujishiro | H04W 4/40 |
| 2020/0107236 A1* | 4/2020 | Tseng | H04W 4/50 |
| 2020/0383014 A1* | 12/2020 | Chen | H04W 56/001 |

FOREIGN PATENT DOCUMENTS

| | | |
|---|---|---|
| CN | 108401246 A | 8/2018 |
| CN | 108605253 A | 9/2018 |
| WO | 2017130742 A1 | 8/2017 |
| WO | 2017170158 A1 | 10/2017 |
| WO | 2018059701 A1 | 4/2018 |
| WO | 2018093220 A1 | 5/2018 |
| WO | 2018202798 A1 | 11/2018 |

OTHER PUBLICATIONS

R2-1814466, Nokia et al., Mobility challenges for NR V2X platooning, 3GPP TSG-RAN WG2 Meeting #103bis, Chengdu, China, Oct. 8-12, 2018, total 2 pages.

3GPP TS 22.186 V16.0.0 (Sep. 2018), 3rd Generation Partnership Project; Technical Specification Group Services and System Aspects; Enhancement of 3GPP support for V2X scenarios; Stage 1 (Release 16), total 16 pages.

TDoc R2-1815044, Ericsson, Resource allocation for Enhanced Mobility, 3GPP TSG-RAN WG2 #103-Bis, Chengdu, China, Oct. 8-12, 2018, total 2 pages.

TDoc R2-1817955, Ericsson, Resource allocation for Enhanced Mobility, 3GPP TSG-RAN WG2 #104, Spokane, WA, USA, Nov. 12-16, 2018, total 3 pages.

International Search Report issued in PCT/CN2019/124200, dated Feb. 26, 2020, 9 pages.

Office Action issued in CN201811561864.5, dated Feb. 3, 2021, 11 pages.

Office Action issued in CN201811561864.5, dated Sep. 13, 2021, 11 pages.

Huawei et al: "Potential RAN2 impacts on gNB scheduled resource allocation for NR V2X", 3GPP Draft; R2-1816518, Nov. 12-16, 2018, 5 pages.

Ericsson: "Mobility for D2D UEs", 3GPP Draft; R3-132277, Nov. 11-15, 2013, 6 pages.

Supplementary European Search Report dated Jan. 21, 2022 issued in European Application No. EP 19 90 0837 (3 pages).

Extended European Search Report dated Feb. 3, 2022 issued in European Application No. EP 19900837.6 (7 pages).

Zhang Jianguo, Comprehensive Analysis of LTE-V Capacity Capability, Designing Techniques of Posts and Telecommunications, Aug. 2018, with an English Abstract, total 5 pages.

Notice of Allowance dated Mar. 2, 2022 issued in Chinese Application No. 201811561864.5 (4 pages).

Communication pursuant to Article 94(3) EPC dated Mar. 14, 2024, for European Application No. 19 900 837.6 (9 pages).

* cited by examiner

WIRELESS NETWORK COMMUNICATIONS METHOD, BASE STATION, TERMINAL, AND COMMUNICATIONS APPARATUS

CROSS-REFERENCE TO RELATED APPLICATIONS

This application is a continuation of International Application No. PCT/CN2019/124200, filed on Dec. 10, 2019, which claims priority to Chinese Patent Application No. 201811561864.5, filed on Dec. 20, 2018. The disclosures of the aforementioned applications are herein incorporated by reference in their entireties.

TECHNICAL FIELD

Embodiments of this application relate to the communications field, and more specifically, to a wireless network communications method, a base station, a terminal, and a communications apparatus.

BACKGROUND

In a wireless network, a base station may communicate with a terminal through an uplink and a downlink. Terminals may communicate with each other through a sidelink.

With development of technologies, a scenario in which a group of terminals communicate with each other through a sidelink gradually emerges, for example, a scenario in which a platoon is introduced in a vehicle-to-external information exchange (V2X) system in a fifth generation (5G) mobile communications technology.

When different terminals in a group of terminals are located in different cells, communication between the group of terminals may be interfered with.

SUMMARY

Embodiments of this application provide a wireless network communications method, a base station, a terminal, and a communications apparatus, to avoid a communications interference problem of a group of terminals during cell handover, and ensure continuity and stability of intra-group communication.

According to a first aspect, a wireless network communications method is provided, and includes: A first base station determines that a first terminal in a first cell is handed over to a second cell, where the first terminal belongs to a group of terminals, and the first cell belongs to the first base station. The first base station sends first information to the first terminal, where the first information indicates a first sidelink resource used by the group of terminals to perform communication, and the first sidelink resource is valid in both the first cell and the second cell.

The foregoing technical solution resolves a problem that is of communications resource configuration of a group of terminals and that exists when the group of terminals perform cell handover. By configuring, for the group of terminals that perform handover, a sidelink resource that is valid in cells or base stations during the handover, a communications interference problem that exists when the group of terminals perform handover is avoided, and continuity and stability of intra-group communication are ensured.

It should be understood that, that a group of terminals perform communication may mean that a group of terminals perform group communication. Correspondingly, in this embodiment of this application, the first sidelink resource used by the group of terminals to perform communication may be a sidelink resource used by the group of terminals to perform group communication.

The group communication may mean that terminals in the group of terminals communicate with each other. For example, one or more terminals in the group of terminals may communicate with any one or more other terminals in the group of terminals, or one or more terminals in the group of terminals may communicate with any one or more other terminals outside the group of terminals, where the any one or more other terminals are not limited to belonging to the group of terminals. A group communications manner includes but is not limited to a unicast manner, a multicast manner, or a broadcast manner.

With reference to the first aspect, in a possible implementation, before the first base station determines that the first terminal in the first cell is handed over to the second cell, the method further includes: The first base station receives group handover information sent by the first terminal, where the group handover information is used to request the first base station to hand over each terminal in a connected state in the group of terminals to a new cell corresponding to the terminal and/or reselect each terminal in an idle state or an inactive state in the group of terminals to a new cell corresponding to the terminal, and new cells corresponding to a plurality of terminals in the group of terminals belong to a same cell, a same base station, or a same cell set.

Group handover is performed on a terminal in a connected state and a terminal in an idle state or an inactive state that are in a group of terminals, so that the terminal in the connected state can be quickly handed over and the terminal in the idle state or the inactive state can quickly perform cell reselection. This improves handover efficiency of the group of terminals.

With reference to the first aspect, in a possible implementation, before the first base station determines that the first terminal in the first cell is handed over to the second cell, the method further includes: The first base station receives measurement result information sent by the first terminal, where the measurement result information includes a cell measurement result of a part or all of terminals in the group of terminals.

With reference to the first aspect, in a possible implementation, that the first base station determines that the first terminal in the first cell is handed over to the second cell includes: The first base station determines, based on the measurement result information, whether each terminal in a connected state in the group of terminals can be handed over to a new cell corresponding to the terminal; and/or the first base station determines, based on the measurement result information, whether each terminal in an idle state or an inactive state in the group of terminals can be reselected to a new cell corresponding to the terminal.

With reference to the first aspect, in a possible implementation, the measurement result information includes a cell measurement result of each terminal in the group of terminals; and/or the measurement result information includes cell information of a cell, with best signal quality, corresponding to each terminal in the group of terminals.

With reference to the first aspect, in a possible implementation, the measurement result information is carried in a measurement report.

With reference to the first aspect, in a possible implementation, the group handover information is carried in a group handover message or carried in a measurement report sent by the first terminal to the first base station.

With reference to the first aspect, in a possible implementation, the method further includes: The first base station sends a handover command or a radio resource control reconfiguration message to each terminal in the connected state in the group of terminals.

With reference to the first aspect, in a possible implementation, the method further includes: The first base station sends reselection priority configuration information of each terminal in the idle state or the inactive state in the group of terminals to the first terminal; or the first base station sends reselection priority configuration information to each terminal in the idle state or the inactive state in the group of terminals.

With reference to the first aspect, in a possible implementation, the method further includes: The first base station obtains an identifier of each terminal in the group of terminals.

With reference to the first aspect, in a possible implementation, that the first base station obtains the identifier of each terminal in the group of terminals includes: The first base station receives the identifier that is sent by the first terminal and that is of each terminal in the group of terminals; or the first base station receives terminal information sent by each terminal in the group of terminals, where the terminal information includes a group identifier of a group to which the terminal belongs.

With reference to the first aspect, in a possible implementation, before the first base station sends the first information to the first terminal, the method further includes: The first base station negotiates the first sidelink resource with a second base station.

With reference to the first aspect, in a possible implementation, that the first base station negotiates the first sidelink resource with the second base station includes: The first base station sends second information to the second base station, where the second information is used to request the second base station to configure a sidelink resource, or the second information is used to recommend a sidelink resource to the second base station; and/or the first base station receives third information sent by the second base station, where the third information includes configuration information of the first sidelink resource, or the third information is used to acknowledge the first sidelink resource.

A sidelink resource that is valid in a plurality of cells or base stations is configured, through negotiation between the base stations, for a group of terminals that perform handover, so that a problem that is of communications resource configuration and that exists when the group of terminals perform handover is resolved, a communications interference problem that exists when the group of terminals perform handover is avoided, and continuity and stability of intra-group communication are ensured.

With reference to the first aspect, in a possible implementation, the second information includes valid duration of the sidelink resource recommended by the first base station.

With reference to the first aspect, in a possible implementation, the second information is carried in a handover request message; and/or the third information is carried in a handover request acknowledgment message.

With reference to the first aspect, in a possible implementation, the method further includes: The first base station releases the first sidelink resource after each terminal in the connected state in the group of terminals is handed over to the new cell corresponding to the terminal, and/or each terminal in the idle state or the inactive state in the group of terminals is reselected to the new cell corresponding to the terminal.

With reference to the first aspect, in a possible implementation, before the first base station releases the first sidelink resource, the method further includes: The first base station receives a request, sent by the second base station, for releasing the first sidelink resource, where the second cell belongs to the second base station.

After all terminals in a group of terminals complete cell handover or reselection, a base station releases a sidelink resource used when the group of terminals perform handover, so that the sidelink resource is used by another group of terminals for handover. This improves utilization of the sidelink resource.

With reference to the first aspect, in a possible implementation, before the first base station releases the first sidelink resource, the method further includes: The first base station determines, based on an identifier of each terminal in the group of terminals, whether each terminal in the connected state is handed over to the new cell corresponding to the terminal, where new cells corresponding to a plurality of terminals in the connected state in the group of terminals belong to a same cell, a same base station, or a same cell set; and/or the first base station receives information that is sent by the first terminal and that indicates that each terminal in the idle state or the inactive state in the group of terminals completes cell reselection, where new cells corresponding to a plurality of terminals in the idle state or the inactive state in the group of terminals belong to a same cell, a same base station, or a same cell set.

With reference to the first aspect, in a possible implementation, the first sidelink resource is a sidelink resource that is valid only in the first cell and the second cell; the first sidelink resource is a sidelink resource that is valid in both the first base station and a second base station to which the second cell belongs; or the first sidelink resource is a sidelink resource that is valid in a first cell set and a second cell set, where the first cell set includes a plurality of cells including the first cell, and the second cell set includes a plurality of cells including the second cell.

With reference to the first aspect, in a possible implementation, before the first base station sends the first information to the first terminal, the method further includes: The first base station determines, based on configuration information of a second sidelink resource currently used by the group of terminals, that the second sidelink resource is unavailable in the second cell, where the second sidelink resource is a sidelink resource that is valid in coverage of a plurality of cells, and the configuration information of the second sidelink resource includes information indicating a valid range of the second sidelink resource.

With reference to the first aspect, in a possible implementation, the method further includes: The first base station sends the configuration information of the first sidelink resource to each terminal in the group of terminals, or sends, to each terminal, configuration information of a sidelink resource that is in the first sidelink resource and that corresponds to the terminal.

With reference to the first aspect, in a possible implementation, the first information is carried in a handover command or a radio resource control reconfiguration message.

With reference to the first aspect, in a possible implementation, the first sidelink resource is a shared resource of the group of terminals; or the first sidelink resource includes the sidelink resource corresponding to each terminal in the group of terminals.

With reference to the first aspect, in a possible implementation, the first information is the configuration information of the first sidelink resource; or the first information is indication information that indicates the group of terminals to continue using a currently used sidelink resource.

A base station configures a currently used sidelink resource for a group of terminals that perform cell handover, so that the group of terminals does not need to perform resource reconfiguration in a handover process. This reduces a delay problem caused by the resource reconfiguration, improves stability of a group communications service in a moving process, and reduces service interruption.

According to a second aspect, a wireless network communications method is provided, and includes: In a process in which a first terminal is handed over from a first cell to a second cell, a second base station negotiates a first sidelink resource with a first base station, where the first terminal belongs to a group of terminals, the first sidelink resource is used by the group of terminals to perform communication, and the first sidelink resource is valid in both the first cell and the second cell.

A sidelink resource that is valid in a plurality of cells or base stations is configured, through negotiation between base stations, for a group of terminals that perform handover, so that a problem that is of group communications resource configuration and that exists when the group of terminals perform handover is resolved, a group communications interference problem that exists when the group of terminals perform handover is avoided, and continuity and stability of intra-group communication are ensured.

With reference to the second aspect, in a possible implementation, that the second base station negotiates the first sidelink resource with the first base station includes: The second base station receives second information sent by the first base station, where the second information is used to request the second base station to configure a sidelink resource, or the second information is used to recommend a sidelink resource to the second base station; and/or the second base station sends third information to the first base station, where the third information includes configuration information of the first sidelink resource, or the third information is used to acknowledge the first sidelink resource.

With reference to the second aspect, in a possible implementation, the second information includes valid duration of the sidelink resource recommended by the first base station.

With reference to the second aspect, in a possible implementation, the second information is carried in a handover request message; and/or the third information is carried in a handover request acknowledgment message.

With reference to the second aspect, in a possible implementation, the method further includes: The second base station receives a notification message sent by the first terminal, where the notification message indicates that each terminal in a connected state in the group of terminals has been handed over to a new cell corresponding to the terminal, and new cells corresponding to a plurality of terminals in the connected state in the group of terminals belong to a same cell, a same base station, or a same cell set, and/or the notification message indicates that each terminal in an idle state or an inactive state in the group of terminals has been reselected to a new cell corresponding to the terminal, and new cells corresponding to a plurality of terminals in the idle state or the inactive state in the group of terminals belong to a same cell, a same base station, or a same cell set. The second base station sends, to the first base station, a request for releasing the first sidelink resource.

With reference to the second aspect, in a possible implementation, the first sidelink resource is a sidelink resource that is valid only in the first cell and the second cell; the first sidelink resource is a sidelink resource that is valid in both the first base station and a second base station; or the first sidelink resource is a sidelink resource that is valid in a first cell set and a second cell set, where the first cell set includes a plurality of cells including the first cell, and the second cell set includes a plurality of cells including the second cell.

With reference to the second aspect, in a possible implementation, the method further includes: The second base station receives configuration information sent by the first base station, where the configuration information includes information indicating a valid range of a second sidelink resource currently used by the group of terminals, and the second sidelink resource is a sidelink resource that is valid in coverage of a plurality of cells. The second base station determines, based on the configuration information, that the second sidelink resource is unavailable in the second cell.

With reference to the second aspect, in a possible implementation, the method further includes: after each terminal in the connected state in the group of terminals has been handed over to the new cell corresponding to the terminal, and/or each terminal in the idle state or the inactive state in the group of terminals has been reselected to the new cell corresponding to the terminal, the second base station configures, for the group of terminals, a third sidelink resource that is valid in coverage of the second base station.

After a group of terminals complete handover, a base station may release a sidelink resource used when the group of terminals perform handover, so that the sidelink resource is used by another group of terminals for handover. This improves utilization of the sidelink resource.

With reference to the second aspect, in a possible implementation, the first sidelink resource is a shared resource of the group of terminals; or the first sidelink resource includes the sidelink resource corresponding to each terminal in the group of terminals.

According to a third aspect, a wireless network communications method is provided, and includes: In a process in which a first terminal is handed over from a first cell to a second cell, the first terminal receives first information sent by a first base station, where the first terminal belongs to a group of terminals, and the first information indicates a first sidelink resource used by the group of terminals to perform communication, and the first sidelink resource is valid in both the first cell and the second cell. The first terminal determines the first sidelink resource based on the first information.

With reference to the third aspect, in a possible implementation, before the first terminal receives the first information sent by the first base station, the method further includes: The first terminal obtains a cell measurement result of a part or all of terminals in the group of terminals. The first terminal sends measurement result information to the first base station, where the measurement result information includes the cell measurement result of the part or all of the terminals.

With reference to the third aspect, in a possible implementation, the measurement result information includes a cell measurement result of each terminal in the group of terminals; and/or the measurement result information includes cell information of a cell, with best signal quality, corresponding to each terminal in the group of terminals.

With reference to the third aspect, in a possible implementation, the measurement result information is carried in a measurement report.

With reference to the third aspect, in a possible implementation, before the first terminal receives the first information sent by the first base station, the method further includes: The first terminal determines, based on a cell measurement result of each terminal in a connected state in the group of terminals, whether the terminal can be handed over to a new cell corresponding to the terminal, where new cells corresponding to a plurality of terminals in the connected state in the group of terminals belong to a same cell, a same base station, or a same cell set; and/or the first terminal determines, based on a cell measurement result of each terminal in an idle state or an inactive state in the group of terminals, whether the terminal can be reselected to a new cell corresponding to the terminal, where new cells corresponding to a plurality of terminals in the idle state or the inactive state in the group of terminals belong to a same cell, a same base station, or a same cell set. The first terminal sends group handover information to the first base station when it is determined that each terminal in the connected state in the group of terminals can be handed over to the new cell corresponding to the terminal, and/or each terminal in the idle state or the inactive state in the group of terminals can be reselected to the new cell corresponding to the terminal, where the group handover information is used to request the first base station to hand over each terminal in the connected state in the group of terminals to the new cell corresponding to the terminal, and/or request the first base station to send reselection priority configuration information to the first terminal or each terminal in the idle state or the inactive state in the group of terminals.

With reference to the third aspect, in a possible implementation, the group handover information is carried in a group handover message or carried in a measurement report sent by the first terminal to the first base station.

With reference to the third aspect, in a possible implementation, the method further includes: The first terminal sends cell priority configuration information to each terminal in the idle state or the inactive state in the group of terminals, so that the terminal is reselected to a specified cell with a highest priority.

With reference to the third aspect, in a possible implementation, the method further includes: The first terminal sends an identifier of each terminal in the group of terminals to the first base station; or the first terminal sends terminal information of the first terminal to the first base station, where the terminal information includes a group identifier of a group to which the first terminal belongs.

With reference to the third aspect, in a possible implementation, the method further includes: The first terminal receives feedback information sent by each of other terminals in the group of terminals, where the feedback information is used to indicate whether the terminal has been handed over or reselected to a new cell corresponding to the terminal.

With reference to the third aspect, in a possible implementation, the first sidelink resource is a sidelink resource that is valid only in the first cell and the second cell; the first sidelink resource is a sidelink resource that is valid in both the first base station and a second base station; or the first sidelink resource is a sidelink resource that is valid in a first cell set and a second cell set, where the first cell set includes a plurality of cells including the first cell, and the second cell set includes a plurality of cells including the second cell.

With reference to the third aspect, in a possible implementation, before the first terminal receives the first information sent by the first base station, the method further includes: The first terminal sends configuration information to the first base station, where the configuration information includes information indicating a valid range of a second sidelink resource currently used by the group of terminals, and the second sidelink resource is a sidelink resource that is valid in coverage of a plurality of cells.

With reference to the third aspect, in a possible implementation, the method further includes: The first terminal sends configuration information of the first sidelink resource to each of the other terminals in the group of terminals; or the first terminal sends, to each of the other terminals in the group of terminals, configuration information of a sidelink resource that is in the first sidelink resource and that corresponds to the terminal.

With reference to the third aspect, in a possible implementation, before the first terminal sends, to each of other terminals in the group of terminals, the configuration information of the sidelink resource that is in the first sidelink resource and that corresponds to the terminal, the method further includes: The first terminal separately configures a corresponding sidelink resource for each of other terminals based on the first sidelink resource.

With reference to the third aspect, in a possible implementation, the first sidelink resource is a shared resource of the group of terminals; or the first sidelink resource includes the sidelink resource corresponding to each terminal in the group of terminals.

With reference to the third aspect, in a possible implementation, the first terminal sends, to each of other terminals in the group of terminals by using a target sidelink resource, configuration information corresponding to the terminal. The target sidelink resource is one of the first sidelink resource, the currently used second sidelink resource, a default sidelink resource, or a pre-configured sidelink resource.

According to a fourth aspect, a wireless network communications method is provided, and includes: A first base station determines that a first terminal in a first cell is handed over to a second cell, where the first terminal belongs to a group of terminals, and the first cell belongs to the first base station. The first base station sends a first message to the first terminal, where the first message does not include first information, and the first information indicates a sidelink resource used by the group of terminals to perform communication.

With reference to the fourth aspect, in a possible implementation, the method further includes: The first base station sends second information to a second base station, where the second information is used to indicate the sidelink resource currently used by the group of terminals, and the second cell belongs to the second base station.

With reference to the fourth aspect, in a possible implementation, the method further includes: The first base station receives third information sent by the second base station, where the third information is used to acknowledge the currently used sidelink resource.

With reference to the fourth aspect, in a possible implementation, the first message is a handover command or a radio resource control reconfiguration message.

According to a fifth aspect, a wireless network communications method is provided, and includes: In a process in which a first terminal is handed over from a first cell to a second cell, a second base station receives second information sent by a first base station, where the first terminal belongs to a group of terminals, the first cell belongs to the first base station, the second cell belongs to the second base station, and the second information is used to indicate a sidelink resource currently used by the group of terminals.

With reference to the fifth aspect, in a possible implementation, the method further includes: The second base station sends third information to the first base station, where the third information is used to acknowledge the currently used sidelink resource.

According to a sixth aspect, a wireless network communications method is provided, and includes: In a process in which a first terminal is handed over from a first cell to a second cell, the first terminal receives a first message sent by the first base station, where the first terminal belongs to a group of terminals, the first cell belongs to the first base station, the first message does not include first information, and the first information indicates a sidelink resource used by the group of terminals to perform communication. The first terminal continues using a currently used sidelink resource to perform communication.

With reference to the sixth aspect, in a possible implementation, the first message is a handover command or a radio resource control reconfiguration message.

According to a seventh aspect, a base station is provided, and includes a module configured to perform the foregoing method, step, operation, or function performed by the first base station.

According to an eighth aspect, a base station is provided, and includes a module configured to perform the foregoing method, step, operation, or function performed by the second base station.

According to a ninth aspect, a terminal is provided, and includes a module configured to perform the foregoing method, step, operation, or function performed by the first terminal.

According to a tenth aspect, a communications apparatus is provided, where the communications apparatus includes at least one processor and a communications interface. The communications interface is used by the communications apparatus to exchange information with another communications apparatus; and when program instructions are executed in the at least one processor, the communications apparatus is enabled to implement the function of the first base station.

According to an eleventh aspect, a communications apparatus is provided, where the communications apparatus includes at least one processor and a communications interface. The communications interface is used by the communications apparatus to exchange information with another communications apparatus; and when program instructions are executed in the at least one processor, the communications apparatus is enabled to implement the function of the second base station.

According to a twelfth aspect, a communications apparatus is provided, where the communications apparatus includes at least one processor and a communications interface. The communications interface is used by the communications apparatus to exchange information with another communications apparatus; and when program instructions are executed in the at least one processor, the communications apparatus is enabled to implement the function of the first terminal.

According to a thirteenth aspect, a computer program storage medium is provided, where the computer program storage medium has program instructions; and when the program instructions are directly or indirectly executed, the function of the first base station is implemented.

According to a fourteenth aspect, a computer program storage medium is provided, where the computer program storage medium has program instructions; and when the program instructions are directly or indirectly executed, the function of the second base station is implemented.

According to a fifteenth aspect, a computer program storage medium is provided, where the computer program storage medium has program instructions; and when the program instructions are directly or indirectly executed, the function of the first terminal is implemented.

According to a sixteenth aspect, a chip system is provided, where the chip system includes at least one processor; and when program instructions are executed in the at least one processor, the function of the first base station is implemented.

According to a seventeenth aspect, a chip system is provided, where the chip system includes at least one processor; and when program instructions are executed in the at least one processor, the function of the second base station is implemented.

According to an eighteenth aspect, a chip system is provided, where the chip system includes at least one processor; and when program instructions are executed in the at least one processor, the function of the first terminal is implemented.

According to a nineteenth aspect, a computer program product is provided, and includes program instructions, where when the program instructions are directly or indirectly executed, the function of the first base station is implemented.

According to a twentieth aspect, a computer program product is provided, and includes program instructions, where when the program instructions are directly or indirectly executed, the function of the second base station is implemented.

According to a twenty-first aspect, a computer program product is provided, and includes program instructions, where when the program instructions are directly or indirectly executed, the function of the first terminal is implemented.

According to a twenty-second aspect, a communications system is provided, and includes the first base station and the first terminal. Optionally, the communications system may further include the second base station.

DESCRIPTION OF EMBODIMENTS

The following describes technical solutions in this application with reference to the accompanying drawings.

A technology of sidelink-based communication between terminals is gradually applied to various fields. The following uses intelligent transportation as an example for description.

To improve safety and intelligence of a transportation system, the concept of an intelligent transportation system is emerging gradually. Intelligent transportation can use next-generation communications networks and data processing capabilities to improve overall efficiency of the transportation system, reduce energy losses, and improve safety and convenience of transportation. V2X is a key technology of a future intelligent transportation system, and the V2X can obtain a series of traffic information such as real-time road conditions, road information, and pedestrian information in communications manners such as vehicle-to-vehicle (V2V) communication, vehicle-to-infrastructure (V2I) communication, vehicle-to-pedestrian (V2P) communication, and vehicle-to-network (V2N) communication, to improve driving safety, reduce congestion, improve traffic efficiency, provide in-vehicle entertainment information, and the like.

Figure 1:
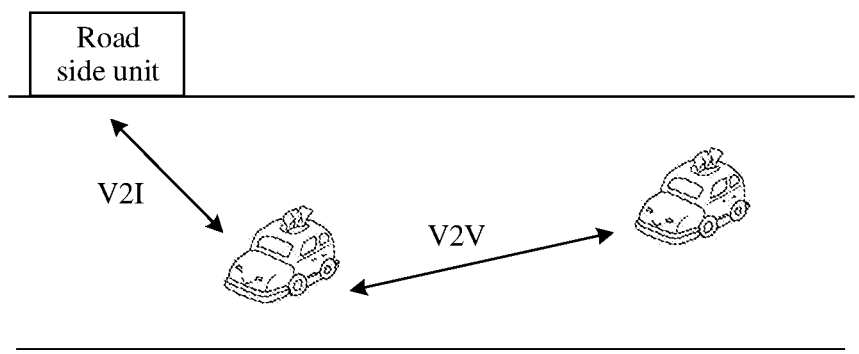
FIG. 1 is a schematic diagram of a V2X communications scenario.

FIG. 1 shows a V2X communications scenario. As shown in FIG. 1, when vehicles communicate with each other through V2V, the vehicles may broadcast, to surrounding vehicles, information such as a vehicle speed, a driving direction, a specific position, and whether an emergency brake is pressed. By obtaining such information, drivers of surrounding vehicles can better perceive traffic conditions beyond the line-of-sight distance, so as to predict and avoid dangerous conditions. For V2I communication, in addition to the foregoing exchange of security information, a roadside infrastructure, for example, a road side unit (RSU), may provide various types of service information and data network access for a vehicle, for example, electronic toll collection and in-vehicle entertainment. These functions greatly improve traffic intelligence.

Figure 2:
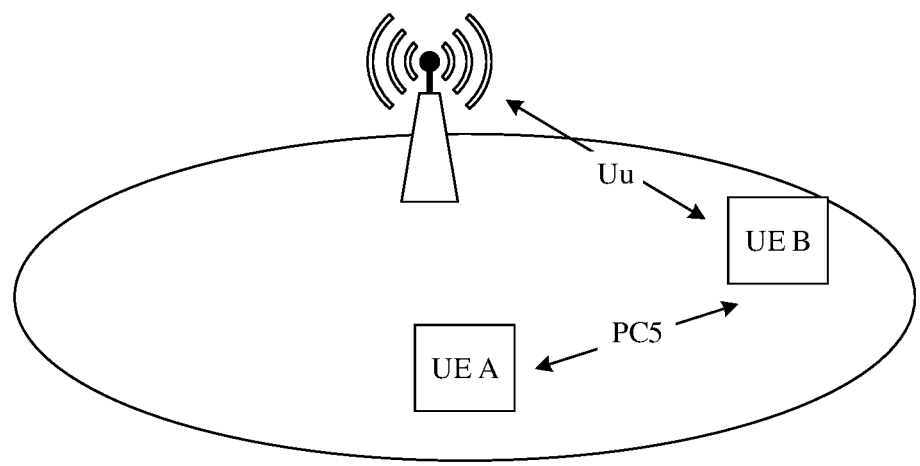
FIG. 2 is a schematic diagram of a V2X network system architecture.

A new radio access technology (NR) is a current mainstream wireless communications technology. For a V2X service feature and a new service requirement, the new radio access technology can support V2X communication with a lower delay and higher reliability. FIG. 2 is a schematic diagram of a V2X network system architecture. In a V2X system shown in the figure, there are mainly two types of air interfaces: a communications interface (Uu interface) between a terminal and a base station and a communications interface (PC5 interface) between terminals. The Uu interface is used for communication between the terminal and the base station or road side unit, and the PC5 interface is used for sidelink communication between the terminals.

The PC5 interface mainly supports two resource allocation modes. A mode 1 (Model 1) mainly supports a terminal in a connected state, and a network device may allocate a dedicated resource by using a dedicated radio network temporary identifier of the terminal device. A mode 2 (Model 2) is mainly for a terminal in a connected state and a terminal in an idle state or an inactive state. The terminal may obtain a contention resource by using a system broadcast message, and the contention resource may be shared and used by more than one terminal.

To implement V2X communication with a lower delay and higher reliability, a plurality of terminals in the V2X system may be grouped into a group of terminals. The group of terminals may perform communication, for example, group communication, based on a sidelink resource. In this application scenario, a lower end-to-end delay and higher reliability are required in cooperative driving with a relatively high automation level, and corresponding sidelink resource allocation also needs to be adapted to maintain a given level of quality of service (QoS) performance when a span range of a group of terminals is relatively large.

It should be understood that, in this embodiment of this application, that a group of terminals perform sidelink-based communication may mean that a group of terminals perform group communication based on a sidelink resource.

For example, in a group communications scenario, a group of terminals may communicate with each other based on a sidelink resource, including but not limited to a manner of unicast, multicast, or broadcast. For example, one or more terminals in a group of terminals may communicate with any one or more other terminals in the group of terminals, and one or more terminals in the group of terminals may further communicate with any one or more other terminals other than the group of terminals. In other words, a case in which any one or more terminals in the group of terminals communicate with any one or more other terminals may be classified as a group communications scenario, where any one or more other terminals are not limited to belonging to the group of terminals.

Figure 3:
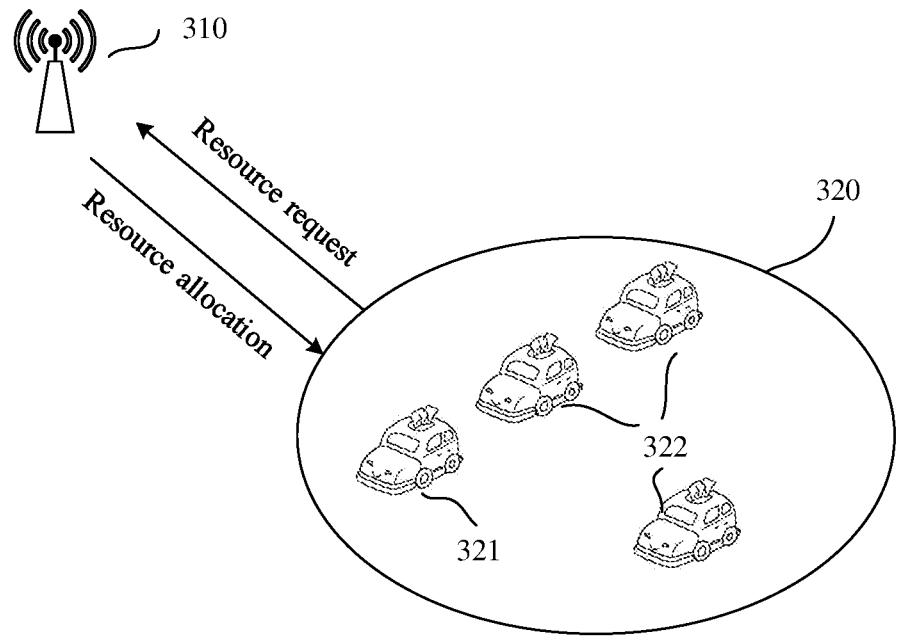
FIG. 3 is a schematic diagram of an application scenario according to an embodiment of this application.

It should be further understood that, for ease of understanding of the technical solutions in this application, an example in which a group of terminals perform group communication is used for description in this embodiment of this application. However, the method in this embodiment of this application is not limited to group communication. FIG. 3 is a schematic diagram of an application scenario according to an embodiment of this application. A communications network architecture shown in FIG. 3 includes a base station 310 and a group of terminals 320.

The base station 310 may be configured to access a terminal to a radio access network (RAN). Therefore, the base station may also be sometimes referred to as an access network device or an access network node. It may be understood that, in systems using different radio access technologies, names of devices having base station functions may be different. For ease of description, in this embodiment of this application, apparatuses that provide a wireless communications access function for the terminal are collectively referred to as a base station. The base station 310 may be, for example, an evolved NodeB (eNB) in long term evolution (LTE), or may be a RAN node in 5G. The base station 310 may be a macro base station, or may be a micro base station. Alternatively, the base station 310 may be a road side device or terminal that has a radio access function. In this embodiment of this application, devices that can implement functions on a base station side in this embodiment of this application are collectively referred to as a base station. Coverage of one base station 310 may include one cell, or may include a plurality of cells.

The group of terminals 320 may include a plurality of terminals, for example, a first terminal 321 and other terminals 322 shown in FIG. 3. The first terminal 321 may be any terminal in the group of terminals. The group of terminals 320 may all be in a connected state (or a radio resource control (RRC) connected state); or a part of terminals in the group of terminals 320 are in a connected state, and a part of terminals are in an idle state or an inactive state (or an RRC idle state). In some scenarios (for example, a 5G NR V2X scenario), the group of terminals may be referred to as a platoon.

The terminal may also be referred to as user equipment (UE). The terminal may communicate with one or more core networks (CN) through the base station. Sometimes, the terminal may also be referred to as an access terminal, a terminal, a subscriber unit, a subscriber station, a mobile station, a mobile console, a remote station, a remote terminal, a mobile device, a user terminal, a wireless network device, a user agent, or a user apparatus. The terminal may be a cellular phone, a cordless phone, a session initiation protocol (SIP) phone, a wireless local loop (WLL) station, a personal digital assistant (PDA), a handheld device having a wireless communications function, a computing device, another device connected to a wireless modem, a vehicle-mounted device, a wearable device, or a terminal device in the internet of things and the internet of vehicles, any forms of terminal device in a future network, and the like.

Terminals in the group of terminals 320 may communicate with each other through a sidelink, and one or more terminals in the group of terminals may further communicate with one or more other terminals other than the group of terminals through the sidelink. For example, in FIG. 3, the first terminal 321 may communicate with any one or more of the other terminals 322 based on the sidelink, and any one or more of the other terminals 322 may also communicate with each other. A communications manner includes but is not limited to a manner such as unicast, multicast, or broadcast. The first terminal 321 or any one or more of the other terminals 322 may further communicate with one or more other terminals other than the group of terminals. This is not limited in this embodiment of this application. A sidelink resource required when the group of terminals perform group communication may be configured by the base station 310. For example, the sidelink resource of the group of terminals 320 may be configured in the following two manners:

Manner 1: When a terminal is in a connected state, the terminal in the connected state may send a sidelink resource request to a network (or a base station), and then the network (or the base station) determines a sidelink resource required when the group of terminals perform group communication.

Manner 2: When a terminal is in an idle state or an inactive state, the terminal may obtain, by using a system information broadcast of a network, a sidelink resource required when the group of terminals perform group communication.

After obtaining the sidelink resource allocated by the network, the terminal may perform group communication based on the sidelink resource.

As the terminal moves, different terminals in the group of terminals may be located in different cells. For example, a part of terminals in the group of terminals 320 are located in a first cell, and a part of terminals are located in a second cell. In this case, if a terminal, entering the second cell, in the group of terminals 320 still uses the original sidelink resource to perform group communication with a terminal in the first cell, or a terminal staying in the first cell uses a new sidelink resource obtained by a terminal that has been handed over to the second cell to perform group communication with a terminal in the second cell, a problem of interference or resource congestion is easily caused.

Therefore, a method for mitigating or avoiding an interference problem urgently needs to be provided. The following describes in detail an embodiment of this application with reference to FIG. 4.

Figure 4:
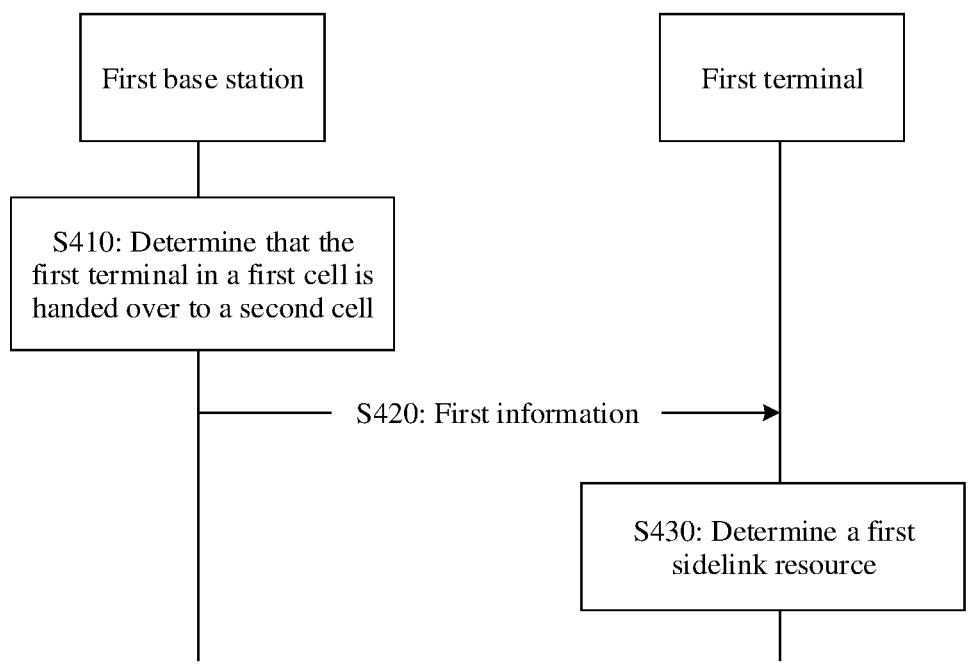
FIG. 4 is a schematic flowchart of a wireless network communications method according to an embodiment of this application.

FIG. 4 is a schematic flowchart of a wireless network communications method according to an embodiment of this application. The method in FIG. 4 may be performed by a first base station. The first base station may be, for example, the base station 310 shown in FIG. 3. The method may include step S410 to step S430.

In step S410, the first base station determines that a first terminal in a first cell is handed over to a second cell.

The first terminal belongs to a group of terminals, and the first cell belongs to the first base station. The first terminal may be any terminal in the group of terminals. In some embodiments, the first terminal may be the 1st terminal that performs cell handover and that is in the group of terminals. Therefore, in this embodiment, the first terminal may also be referred to as a head terminal (or head UE).

The second cell may belong to the first base station, or may belong to a second base station different from the first base station. In other words, a handover process corresponding to step S410 may be an intra-base station cell handover process, or may be an inter-base station cell handover process. When the first cell and the second cell belong to different base stations, the first base station may be referred to as a source base station, and the second base station may be referred to as a target base station.

The first base station may determine, in a plurality of manners, that the first terminal in the first cell is handed over to the second cell. For example, the first base station may receive measurement result information sent by the first terminal, and then determine, based on the measurement result information, that the first terminal is handed over from the first cell to the second cell, where the measurement result information may be carried in a measurement report. For another example, the first base station may receive a handover request sent by the first terminal, and then determine, based on the handover request, that the first terminal is ready to be handed over from the first cell to the second cell. The following provides detailed descriptions with reference to specific embodiments, and details are not described herein.

In step S420, the first base station sends first information to the first terminal. The first information may indicate a first sidelink resource used by the group of terminals to perform communication.

The first sidelink resource may be used by the group of terminals to perform group communication.

The first sidelink resource is valid in both the first cell and the second cell.

The first sidelink resource may be the same as a second sidelink resource currently used by the group of terminals, or may be different from a sidelink resource currently used by the group of terminals.

The first information may be carried in a handover command or radio resource control reconfiguration message sent by the first base station to the first terminal, or may be carried in new signaling, for example, newly added resource indication signaling or resource configuration signaling.

The first information may indicate the first sidelink resource in a plurality of manners: in a direct manner or in an indirect manner.

In an example, the first information may be configuration information of the first sidelink resource. The configuration information of the first sidelink resource may indicate, for example, one or more of the following information of the first sidelink resource: a time-frequency position, a valid range, valid duration, a RAN higher-layer configuration (for example, a service data adaptation protocol (SDAP) configuration, and a packet data convergence protocol (PDCP) configuration).

In another example, the first information may indicate the first sidelink resource by using an index of a sidelink resource. The first terminal may determine the first sidelink resource based on the index. For example, an index field and a mapping relationship between a sidelink resource and an index may be pre-configured on a terminal side and a network side, and the first terminal may determine the first sidelink resource based on a mapping relationship between the index and the first sidelink resource.

In still another example, when the first sidelink resource is the same as the second sidelink resource currently used by the group of terminals, the first information may be indication information that indicates the group of terminals to continue using the currently used second sidelink resource. For example, the first information may include one bit, and when the bit is 1 (or 0), the first information may indicate the group of terminals to continue using the currently used second sidelink resource to perform group communication.

In some other embodiments, the first base station may not send the first information to the first terminal. When the first terminal does not receive information that is sent by the first base station and that is about the first sidelink resource, the first terminal may continue to use the currently used second sidelink resource by default.

That the first sidelink resource is valid in both the first cell and the second cell may mean that the first sidelink resource is a pre-configured or pre-negotiated sidelink resource that can be used in both the first cell and the second cell. The first sidelink resource may be a dedicated sidelink resource, or may be a sidelink resource configured by a base station or determined through negotiation between base stations. This is not limited in this embodiment of this application. The base station may configure a proper allocation or scheduling manner based on a service QoS requirement of the group of terminals, and the service QoS requirement of the group of terminals may be fed back by using a measurement report of the group of terminals.

The first sidelink resource may be a resource shared by the group of terminals, or may include a sidelink resource corresponding to each terminal in the group of terminals (in other words, the first sidelink resource may include an independent sidelink resource corresponding to each terminal).

The first sidelink resource may be a sidelink resource that is valid only in the first cell and the second cell; the first sidelink resource may be a sidelink resource that is valid in both the first base station and a second base station to which the second cell belongs; or the first sidelink resource may be a sidelink resource that is valid in a first cell set and a second cell set, where the first cell set includes a plurality of cells including the first cell, and the second cell set includes a plurality of cells including the second cell. A cell set including a plurality of cells may also be sometimes referred to as an area. Correspondingly, the first sidelink resource may be referred to as a cross-area sidelink resource.

In step S430, the first terminal determines the first sidelink resource based on the first information sent by the first base station.

For a manner in which the first base station determines the first sidelink resource, refer to the foregoing descriptions of the first information. For brevity, details are not described herein again.

According to the wireless network communications method provided in this embodiment, a problem that is of group communications resource configuration of a group of terminals and that exists when the group of terminals perform cell handover is resolved. By configuring, for the group of terminals that perform cell handover, a sidelink resource that is valid in cells or base stations during handover or reselection, a group communications interference problem that exists when the group of terminals perform handover is avoided, and continuity and stability of intra-group communication are ensured.

Figure 5:
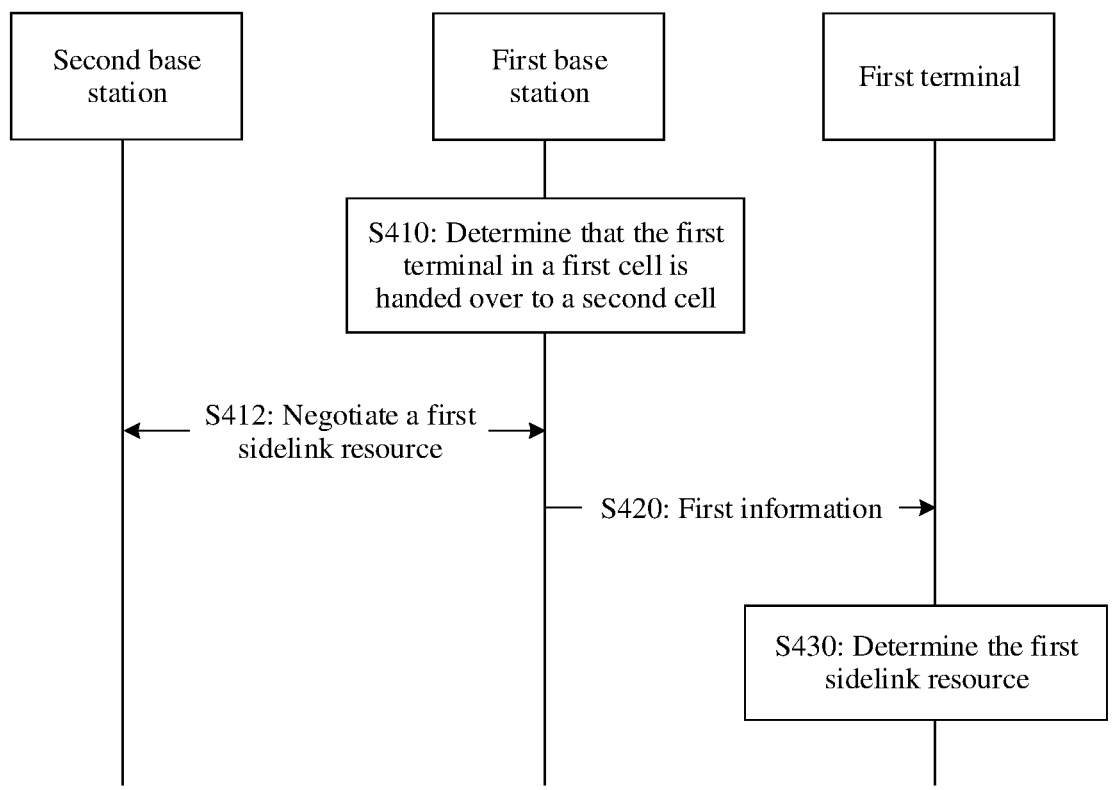
FIG. 5 is a schematic flowchart of a wireless network communications method according to another embodiment of this application.

As mentioned above, the first cell and the second cell may belong to a same base station, or may belong to different base stations. When the first cell and the second cell belong to a same base station, the first sidelink resource may be configured by the first base station. When the first cell belongs to the first base station, and the second cell belongs to the second base station, the first sidelink resource may be determined through negotiation between the first base station and the second base station. With reference to FIG. 5, the following describes a negotiation process between the first base station and the second base station for a first sidelink resource by using an example.

Compared with FIG. 4, FIG. 5 may further include step S412: The first base station negotiates, with the second base station, the first sidelink resource used by the group of terminals to perform communication. A detailed negotiation process is subsequently described.

There may be a plurality of negotiation manners between the first base station and the second base station.

In an example, the first base station may send second information to the second base station, where the second information may be used to request the second base station to configure a sidelink resource. Correspondingly, the second base station may send third information to the first base station, where the third information may include the configuration information of the first sidelink resource.

In another example, the first base station may send second information to the second base station, where the second information may be used to recommend a sidelink resource to the second base station. Correspondingly, the second base station may send third information to the first base station, where the third information may be acknowledgment information, to acknowledge the sidelink resource recommended by the first base station. The second information may include configuration information of the recommended sidelink resource. For example, the second information includes configuration information of a plurality of sidelink resources, and this indicates that the first base station recommends the plurality of sidelink resources to the second base station.

In still another example, the first base station may send second information to the second base station, where the second information may be used to indicate a sidelink resource, with a relatively large range, recommended by the first base station. Correspondingly, after selecting the first sidelink resource from the sidelink resource with a relatively large range, the second base station may send, to the first base station, third information including the configuration information of the first sidelink resource.

In still another example, the first base station may send second information to the second base station, where the second information includes the configuration information of the first sidelink resource recommended by the first base station, and the second base station may not send third information to the first base station. The first base station may consider by default that the second base station acknowledges the first sidelink resource recommended by the first base station. For example, the first base station may recommend, to the second base station, the first sidelink resource that is the same as the second sidelink resource currently used by the group of terminals, to request the second base station not to schedule the first sidelink resource in coverage of the second base station. In this case, the second base station may acknowledge the first sidelink resource in a manner of sending the third information to the first base station, or may acknowledge the first sidelink resource in a manner of not sending the third information to the first base station.

The second information may be carried in a handover request message, and the third information may be carried in a handover request acknowledgment message. Alternatively, the second information and/or the third information may be carried in newly added signaling.

Optionally, the second information may further include valid duration of the sidelink resource recommended by the first base station, and the valid duration may be implemented by using a timer.

It should be understood that, the sidelink resource recommended by the first base station or the sidelink resource acknowledged or selected by the second base station is valid in both the first base station and the second base station.

According to the wireless network communications method provided in this embodiment, a problem that is of group communications resource configuration of a group of terminals and that exists when the group of terminals perform cell handover or reselection is resolved. By configuring, for the group of terminals that perform handover, a sidelink resource that is valid in cells or base stations during handover or reselection, a communications interference problem that exists when the group of terminals perform handover is avoided, and continuity and stability of intra-group communication are ensured.

There may be a plurality of implementations in which the first base station determines that the first terminal is handed over from the first cell to the second cell described in step S410, and several possible implementations are provided below.

In a possible implementation, the first base station may actively determine whether the first terminal is handed over from the first cell to the second cell.

For example, the first base station may actively determine, based on the measurement result information sent by the first terminal, whether the first terminal is handed over from the first cell to the second cell.

For example, the first base station may hand over only the first terminal to the second cell, or may hand over a group of terminals or each terminal in a connected state in a group of terminals to a new cell corresponding to the terminal, or may reselect each terminal in an idle state or an inactive state in a group of terminals to a new cell corresponding to the terminal. The handover manner is referred to as "group handover" in this application. It should be understood that, for a group handover process, this application does not necessarily require that each terminal in a group of terminals is handed over to a new cell corresponding to the terminal. If each terminal in a group of terminals is in a connected state, the group handover may be used to request the first base station to hand over all terminals in the group of terminals to a new cell corresponding to the terminal. If a part of terminals in a group of terminals are in a connected state, and a part of terminals are in an idle state or an inactive state, the group handover may be used to request the first base station to hand over each terminal in the connected state in the group of terminals to a new cell corresponding to the terminal, or hand over each terminal in the connected state in the group of terminals to a new cell corresponding to the terminal, and reselect each terminal in the idle state or the inactive state in the group of terminals to a new cell corresponding to the terminal.

To implement group handover, the measurement result information, for example, a measurement report, sent by the first terminal to the first base station may include a cell measurement result of a part or all of terminals in the group of terminals. For example, the measurement report may include a cell measurement result of each terminal in the group of terminals. Alternatively, the measurement report may include a cell measurement result of the terminal in the connected state in the group of terminals. Alternatively, the measurement report may include cell information of a cell with best signal quality, corresponding to each terminal in the group of terminals.

For example, the measurement report may include a cell measurement result of the first terminal. In this case, the first base station may determine, based on the cell measurement result, whether the first terminal can be handed over to the second cell.

For another example, the measurement report may further include a cell measurement result of a terminal in a connected state in a group of terminals. In this case, the first base station may determine, based on the cell measurement result, whether each terminal in the connected state in the group of terminals can be handed over to a new cell corresponding to the terminal.

For another example, the measurement report may include a cell measurement result of a terminal in an idle state or an inactive state in a group of terminals, and the first base station may determine, based on the cell measurement result, whether each terminal in the idle state or the inactive state in the group of terminals can be reselected to a new cell corresponding to the terminal.

When a group of terminals can perform group handover, the first base station may send a handover command or a radio resource control reconfiguration message to each terminal in a connected state in the group of terminals, so that each terminal in the connected state in the group of terminals is handed over to a new cell corresponding to the terminal. When a terminal in an idle state or an inactive state exists in a group of terminals, to enable the terminal in the idle state or the inactive state to be reselected to a specified cell, the first base station may send a reselection priority configuration information to each terminal in the idle state or the inactive state in the group of terminals, so that each terminal in the idle state or the inactive state in the group of terminals is reselected to a new cell corresponding to the terminal. Alternatively, the first base station may send reselection priority configuration information of each terminal in the idle state or the inactive state in the group of terminals to the first terminal, and the first terminal sends the reselection priority configuration information to another terminal in the idle state or the inactive state, so that each terminal in the idle state or the inactive state is reselected to a specified new cell or a corresponding new cell.

It should be noted that, new cells corresponding to a plurality of terminals in the group of terminals may be a same cell, may belong to a same base station, or may belong to a same cell set, and the cell set may include a plurality of cells or cells of a plurality of base stations. For example, a plurality of terminals in the group of terminals may be handed over to a same cell, or may be handed over to different cells in a same base station, or handed over to different cells or different base stations in a same cell set.

In another possible implementation, the first terminal may actively determine whether the first terminal is handed over from the first cell to the second cell, and report a result to the first base station.

For example, the first terminal may actively determine whether the first terminal is handed over from the first cell to the second cell. When preparing to be handed over from the first cell to the second cell, the first terminal may request the first base station to hand over the first terminal.

For another example, the first terminal may collect cell measurement information of other terminals in a group of terminals by using a currently used sidelink resource, a pre-configured sidelink resource, or a default sidelink resource, and determine, based on the cell measurement information of the other terminals, whether to perform group handover. For example, the first terminal may determine, based on a cell measurement result of each terminal in a connected state in a group of terminals, whether the terminal can be handed over to a new cell corresponding to the terminal, or the first terminal may determine, based on a cell measurement result of each terminal in a connected state in a group of terminals, whether the terminal can be handed over to a new cell corresponding to the terminal, and determine, based on a cell measurement result of each terminal in an idle state or an inactive state in a group of terminals, whether the terminal can be reselected to a new cell corresponding to the terminal. Herein, new cells corresponding to a plurality of terminals in the group of terminals may belong to a same cell, a same base station, or a same cell set.

When a group of terminals is ready to perform group handover, the first terminal may send group handover information to the first base station, to request the first base station to hand over each terminal in the connected state in the group of terminals to a new cell corresponding to the terminal, or request the first base station to hand over each terminal in the connected state in the group of terminals to a new cell corresponding to the terminal, and enable each terminal in the idle state or the inactive state in the group of terminals to be reselected to a new cell corresponding to the terminal. The group handover information may be carried in a group handover message or a measurement report sent by the first terminal to the first base station.

In addition, when terminals in an idle state or an inactive state exist in a group of terminals, to enable the terminals in the idle state or the inactive state to be reselected a specified cell, the first terminal may send specified cell priority configuration information to the terminals in the idle state or the inactive state through a sidelink, to configure a reselection priority of the specified cell to the highest value, so that each terminal in the idle state or the inactive state is reselected to a specified cell with a highest priority.

There are a plurality of manners of determining a cell corresponding to each terminal to be handed over or reselected to. For example, it may be determined, based on a measurement result of each terminal in a group of terminals, whether a cell whose signal strength is not lower than a preset threshold exists for all terminals. If the cell exists, the cell may be used as a cell for handover or reselection. Alternatively, if there are a plurality of cells that meet the condition, a cell with a maximum minimum signal strength or a cell with a maximum average signal strength for all terminals may be selected as a cell for handover or reselection.

When a group of terminals can perform group handover, the first base station may send the first information to each terminal in the group of terminals. Before this, the first terminal needs to first obtain an identifier of each terminal in the group of terminals.

In an example, the first base station may receive an identifier that is of each terminal in a group of terminals and that is sent by the first terminal.

The identifier may be carried in the measurement report. For example, the identifier may be a physical layer terminal identifier (UE ID) of each terminal of the group of terminals in the first base station or a cell radio network temporary identifier.

In another example, the first base station may receive terminal information sent by each terminal in a group of terminals, where the terminal information may include a group identifier of a group to which each terminal belongs, or an identifier of each terminal.

After step S430, the first terminal may determine the first sidelink resource, and other terminals in the group of terminals may obtain configuration information of the sidelink resource in a plurality of manners.

In an example, the first sidelink resource may be a shared resource, for example, a resource pool used for sharing by a plurality of terminals. The first terminal may send the configuration information of the first sidelink resource to each of the other terminals in a group of terminals.

In another example, the first sidelink resource may include configuration information of a sidelink resource corresponding to each terminal in a group of terminals. In this case, the first terminal may send, to each of the other terminals in the group of terminals, the configuration information of the sidelink resource that is in the first sidelink resource and that corresponds to the terminal, where the sidelink resource corresponding to the terminal may be configured by the first base station.

In still another example, the first terminal may separately configure a corresponding sidelink resource for each of other terminals based on the first sidelink resource, and then send, to each of other terminals in a group of terminals, configuration information of the sidelink resource corresponding to the terminal.

For example, the first terminal may send, to each of other terminals in a group of terminals by using a target sidelink resource, configuration information corresponding to the terminal or the configuration information of the first sidelink resource. The target sidelink resource may be the first sidelink resource, may be the currently used second sidelink resource, or may be a default or pre-configured sidelink resource. This is not limited in this application.

In the foregoing examples, other terminals in the group of terminals may obtain configuration information of a corresponding sidelink resource by using the first terminal. In an example given below, other terminals in the group of terminals may obtain configuration information of a corresponding sidelink resource by using the first base station.

In still another example, the first base station may directly send, to each terminal in a group of terminals, configuration information of a corresponding sidelink resource configured by the first base station or the configuration information of the first sidelink resource.

Figure 6:
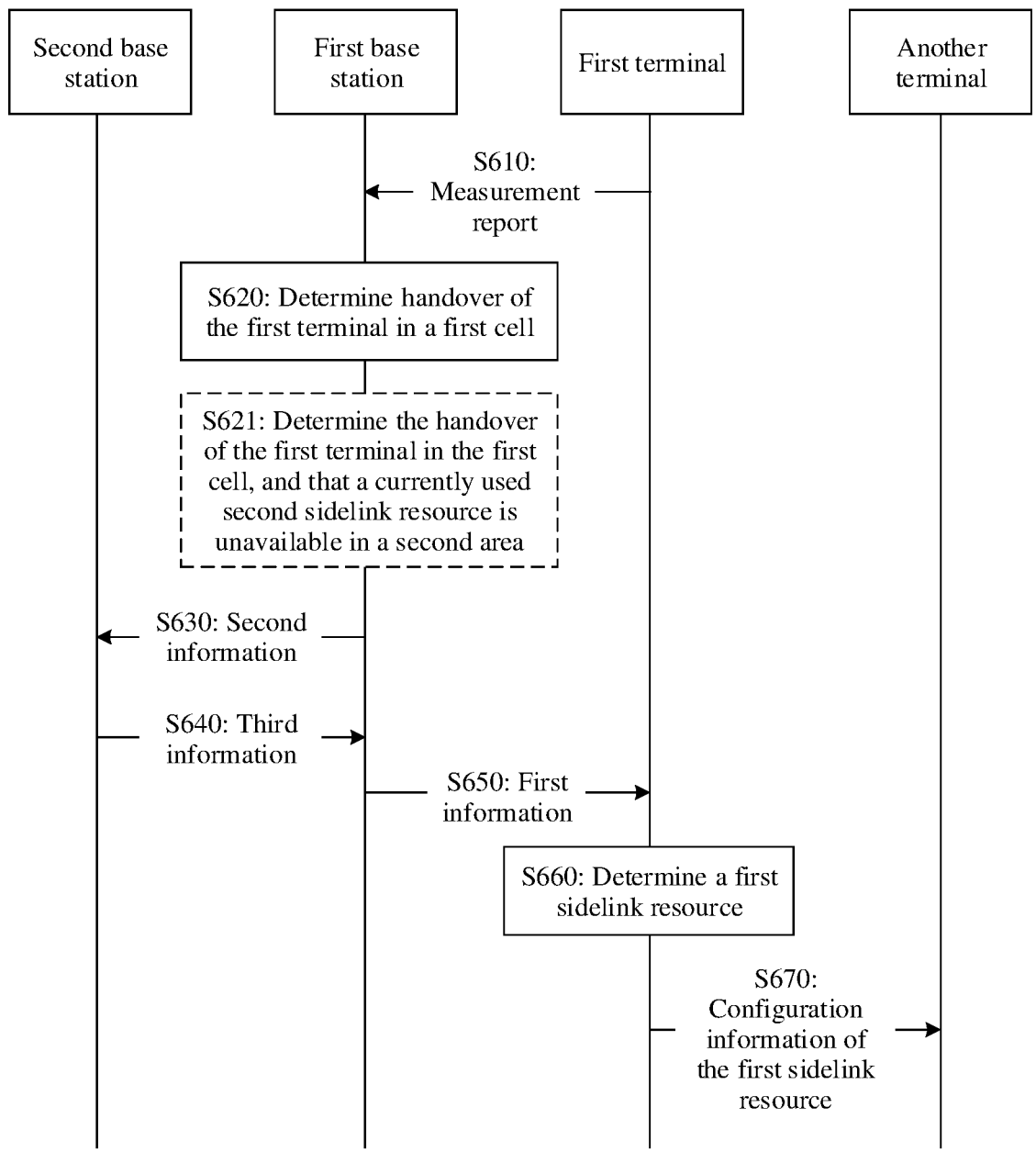
FIG. 6 is a schematic flowchart of a wireless network communications method according to still another embodiment of this application.

FIG. 6 is a schematic flowchart of a wireless network communications method according to an embodiment of this application. The method includes step S610 to step S670 marked by a solid line. The following describes the steps in detail with reference to a specific embodiment.

For example, the method may be applied to a scenario in which a group of terminals cross cells, cross base stations, or cross areas. Crossing cells may be understood as that different terminals in the group of terminals are located in different cells. For example, a part of terminals in the group of terminals are located in a first cell, and a part of terminals are located in a second cell. Crossing base stations may be understood as that different terminals in the group of terminals are located in different base stations. For example, a part of terminals in the group of terminals are located in a first base station, and a part of terminals are located in a second base station. This embodiment of this application does not limit whether the part of terminals are in a same cell or different cells in the first base station or the second base station. Crossing areas may be understood as that different terminals in the group of terminals are located in different areas, and the area may include a plurality of cells or a plurality of base stations. For example, a part of terminals in the group of terminals are located in a first area, and a part of terminals are located in a second area. This embodiment of this application does not limit whether the part of terminals are in a same cell/base station or different cells/base stations in the first area or the second area. For ease of understanding, the following relates to a group communications scenario in which only a part of terminals in the group of terminals are handed over to a new cell/base station/area. The scenario is denoted as crossing cells, crossing base stations, or crossing areas. The wireless network communications method in this embodiment of this application is described below by using crossing base stations as an example. It is assumed that terminals of a group of terminals are initially located in the first base station, and group communication is performed by using a second sidelink resource. A first terminal may be any one of the group of terminals. When the first terminal is the 1st terminal that enters a new cell, a new base station, or a new area, the first terminal may also be referred to as a head terminal (head UE).

In step S610, the first terminal sends a measurement report to the first base station.

In step S620, the first base station determines handover of the first terminal of the first cell.

There may be two manners when a group of terminals is handed over from the first base station to the second base station. A first manner is that a plurality of terminals in the group of terminals are handed over according to a specific sequence, and a second manner is that a plurality of terminals in a connected state in the group of terminals may be handed over simultaneously, or each terminal in a connected state in the group of terminals may be handed over simultaneously, and each terminal in an idle state or an inactive state in the group of terminals may be reselected to a new cell within a preset time.

For the handover in the first manner, a measurement report may include a cell measurement result of the first terminal, a cell measurement result of a part of terminals in a connected state or in an idle state or an inactive state, or the like. The first base station may determine, based on the measurement result, whether the first terminal or the part of terminals can perform handover or reselection.

For the handover in the second manner, a measurement report may include cell measurement results of all terminals in a connected state, and the first base station may determine, based on the measurement results, whether each terminal in the connected state in the group of terminals can perform group handover. Alternatively, the measurement report may further include cell measurement results of all terminals in the connected state or in the idle state or the inactive state, and the first base station may determine, based on the measurement result, whether each terminal in the group of terminals can perform group handover.

For example, "group handover" herein may mean that all terminals in the connected state in the group of terminals are handed over, or all terminals in the connected state in the group of terminals are handed over to a new cell/new base station/new area, and all terminals in the idle state or the inactive state in the group of terminals are reselected to a new cell/new base station/new area.

In other words, if a terminal in an idle state or an inactive state exists in other terminals, the group handover in this embodiment of this application may further include that terminals in the idle state or the inactive state simultaneously reselected to a cell, a base station, or an area to which the terminal in the connected state is handed over.

Optionally, before step S610, the first terminal may obtain, through sidelink communication of a group of terminals, cell measurement results of other terminals in the group of terminals or ID information of a cell with a strongest signal obtained through measurement, and then report to a network in a unified manner by using measurement reporting signaling.

In step S620, the first base station determines, based on the received measurement result, whether the group of terminals can perform group handover.

A sidelink resource used by the first terminal may be a second sidelink resource currently used by the group of terminals, or may be a pre-configured sidelink resource, or may be a default sidelink resource. This is not limited in this application.

The first base station determines, based on the received measurement result, whether each terminal in the connected state in the group of terminals can be handed over to a new cell corresponding to the terminal; or determines whether each terminal in the connected state in the group of terminals can be handed over to a new cell corresponding to the terminal, and whether each terminal in the idle state or the inactive state in the group of terminals can be reselected to a new cell corresponding to the terminal.

Optionally, a step of determining whether a group of terminals can perform group handover may be further determined by the first terminal. After determining, based on a cell measurement result of each terminal in the group of terminals, that the group of terminals can perform group handover, the first terminal may send group handover request information to the first base station. The group handover information may be used to request the first base station to perform group handover on the group of terminals, for example, request the first base station to hand over each terminal in the connected state in the group of terminals to a new cell corresponding to the terminal, or request the first base station to hand over each terminal in the connected state in the group of terminals to a new cell corresponding to the terminal, and request the first base station to reselect each terminal in the idle state or the inactive state in the group of terminals to a new cell corresponding to the terminal. The group handover information may be carried in a group handover message, or may be carried in a measurement report sent by the first terminal to the first base station. This is not limited in this application.

Regardless of whether the first base station determines the group handover or the first terminal determines the group handover, there are a plurality of manners of determining the group handover.

In an example, the first base station or the first terminal may determine, based on measurement results of all terminals, whether a cell whose signal strength is not lower than a preset threshold exists for all terminals. If the cell exists, the first terminal requests the first base station to hand over the first terminal to the cell, or the first base station requests the second base station to hand over the terminal to the cell after the first base station determines.

In another example, if there are a plurality of cells that meet the foregoing condition, the first terminal or the first base station may select a cell with maximum minimum signal strength for all terminals, or select a cell with maximum average signal strength for all terminals.

It should be understood that, when group handover can be performed, all terminals in a group of terminals may also be handed over or reselected to different cells. Herein, the first base station or the first terminal may determine, based on a cell measurement result of each terminal in the group of terminals, a new cell to which the terminal can be handed over or reselected, and that a plurality of terminals in the group of terminals are handed over to a same cell is not limited.

In step S630, the first base station sends second information to the second base station. The second information may be carried in a handover request message.

In step S640, the second base station sends third information to the first base station. The third information may be carried in a handover request acknowledgment message.

For ease of understanding, the following describes, by using an example in which the second information is carried in the handover request message and the third information is carried in the handover request acknowledgment message, several implementations in which the first base station and the second base station negotiate and determine the sidelink resource requested by the group of terminals.

In a possible implementation, the handover request message sent by the first base station may carry request information of a cross-base station sidelink resource, to request the second base station to configure the sidelink resource. In this case, the handover request acknowledgment message sent by the second base station may carry the cross-base station sidelink resource configured by the second base station for the group of terminals.

It should be understood that, for ease of understanding, in this embodiment of this application, a sidelink resource used by the group of terminals in a cross-base station scenario is denoted as a cross-base station sidelink resource. Similarly, a sidelink resource used by the group of terminals in a cross-cell scenario is denoted as a cross-cell sidelink resource. A sidelink resource used by the group of terminals in a cross-area scenario is denoted as a cross-area sidelink resource. In a corresponding application scenario, the first sidelink resource and the cross-cell/base station/area sidelink resource may represent a same sidelink resource. The cross-base station sidelink resource may be a sidelink resource that is valid in ranges of both the first base station and the second base station, and the cross-base station sidelink resource may be valid in a plurality of cells in a range of the first base station and a plurality of cells in a range of the second base station.

In another possible implementation, the handover request message sent by the first base station may carry a recommended cross-base station sidelink resource. For example, the first base station recommends one or more cross-base station sidelink resources, and the handover request acknowledgment message sent by the second base station may carry the cross-base station sidelink resources acknowledged by the second base station for the group of terminals. For another example, the first base station may further provide a sidelink resource with a relatively large range for the second base station, and the handover request acknowledgment message sent by the second base station may carry the cross-base station sidelink resource selected or acknowledged by the second base station for the group of terminals. For still another example, the first base station may notify the second base station of the currently used second sidelink resource in the handover request message, so as to request the second base station not to schedule the second sidelink resource in coverage of the second base station. In this case, the handover request acknowledgment message sent by the second base station may not carry information about the cross-base station sidelink resource, and the first base station knows to continue using the currently used sidelink resource, or the handover request acknowledgment message may carry the currently used sidelink resource, to notify the first base station to continue using the currently used sidelink resources.

It should be understood that, when the second base station acknowledges that the first base station continues using the currently used second sidelink resource, the currently used second sidelink resource is also a cross-base station sidelink resource, and is valid both in ranges of the first base station and the second base station.

When a group of terminals continues using the currently used second sidelink resource, each terminal in the group of terminals does not need to perform resource reconfiguration when performing cell handover. This reduces a delay caused by sidelink resource reconfiguration, improves stability of a group communications service in a terminal movement process, and reduces service interruption.

Optionally, the handover request acknowledgment message may further carry valid duration of the cross-base station sidelink resource, and the valid duration may be controlled by a timer. The cross-base station sidelink resource may be used only by the group of terminals, and the base station may configure a proper allocation or scheduling manner based on a service QoS requirement of the group of terminals.

For a cross-cell scenario, for example, a group of terminals are handed over from the first cell to the second cell, and the first cell and the second cell may belong to a same base station, for example, the first base station, after step S620, the first base station does not need to negotiate with the second base station to obtain the cross-base station sidelink resource. The first base station may independently perform a configuration or an indication. For example, the first base station reconfigures a cross-cell sidelink resource for the group of terminals. Alternatively, if a currently used sidelink resource is a cross-cell sidelink resource, the first base station may further notify the first terminal or a group of terminals to continue using the currently used sidelink resource.

In step S650, the first base station sends first information to the first terminal. The first information may be used to indicate configuration information of the cross-base station sidelink resource, and the first information may be carried in a handover command or a radio resource control reconfiguration message.

In a possible implementation, the first base station may carry, in the handover command or the radio resource control reconfiguration message, the cross-base station sidelink resource negotiated by the first base station with the second base station.

In another possible implementation, when the cross-base station sidelink resource determined through negotiation between the first base station and the second base station is the same as the sidelink resource currently used by the group of terminals in the first base station, the handover command or the radio resource control reconfiguration message may not carry configuration information of the resource, and the first information is used to indicate the group of terminals to continue using the currently used sidelink resource. For example, the first base station may carry indication information in the handover command or the radio resource control reconfiguration message. For example, the indication information is indicated by using one bit. If the bit is 1 (or 0), it indicates that the first terminal or the group of terminals does/do not need to change the sidelink resource used for group communication.

In still another possible implementation, the first base station may carry neither the configuration information of the negotiated cross-base station sidelink resource nor the indication information in the handover command or the radio resource control reconfiguration message. Correspondingly, If the first terminal finds that the handover command or the radio resource control reconfiguration message does not carry the configuration information of the sidelink resource, the first terminal continues using the currently used sidelink resource.

When the group of terminals can perform group handover, the first base station may send the handover command to the group of terminals, but the first base station needs to obtain group information of the group of terminals in advance.

In a possible implementation, the first terminal may carry, in the measurement report in step S610, group information of a group to which the first terminal belongs, for example, physical layer UE IDs of all members in the source base station or a cell radio network temporary identifier.

In a possible implementation, a process in which the network obtains the group information may be completed before, that is, the first base station receives terminal information sent by each terminal in the group of terminals, where the terminal information includes an identifier of the terminal and a group identifier of a group to which the terminal belongs. For example, when a terminal in a connected state joins the group of terminals, the terminal may be triggered to send signaling, for example, sidelink terminal information (sidelink UE information), to a network. When a process of joining a group is upper-layer management, an upper layer of the terminal is enabled to notify an access stratum of the terminal of the group joining event. In addition, the signaling carries the group identifier, for example, a group ID. Because terminals that join a same group report a same group identifier to the network, the network may learn of radio network temporary identifiers of all terminals in a group based on the same group identifier.

It should be understood that the "network" described herein may be a base station.

When the first base station determines that the group of terminals can perform group handover, the first base station may simultaneously notify each terminal in the connected state in the group of terminals to perform handover, and step S670 may not be performed. For example, the first base station may send the handover command or the radio resource control reconfiguration message to each terminal in the connected state in the group of terminals, or may send reselection priority configuration information of each terminal to the terminal in the idle state or the inactive state in the group of terminals. The first base station may further send the foregoing message or information to the first terminal, and this is described in detail in step S670 below.

In step S660, the first terminal determines the first sidelink resource based on the first information.

For a manner in which the first terminal determines the first sidelink resource in this step, refer to the description of the first information in step S650. For brevity, details are not described herein again.

In step S670, the first terminal sends the configuration information of the first sidelink resource, that is, the cross-base station sidelink resource determined by the base station, to other terminals through sidelink communication.

The first terminal may perform step S670 by using the currently used second sidelink resource, the cross-base station sidelink resource negotiated by the first base station with the second base station, a sidelink resource pre-configured by the network, or a default sidelink resource.

Optionally, the first base station may further send a configuration of the cross-base station sidelink resource to the first terminal (configured by the upper layer), and then the first terminal (configured by the upper layer) sends the configuration to another terminal (other than the first terminal) that is not handed over or reselected.

The another UE may be in a connected state, or may be in an idle state or an inactive state.

If terminals in the idle state or the inactive state exist in the group of terminals, to enable the terminals in the idle state or the inactive state to be reselected to a specified cell, the first terminal may receive reselection priority configuration information that is sent by the first base station and that is of each terminal in the idle state or the inactive state in the group of terminals. Then, the first terminal sends specified cell priority configuration information or reselection priority configuration information to the terminals in the idle state or the inactive state through the sidelink, so as to configure a reselection priority of the specified cell to the highest value.

The cross-base station sidelink resource may be a shared resource, for example, a "resource pool" used by a plurality of terminals. In this case, the first base station may send configuration information or indication information of the shared sidelink resource to each terminal in the group of terminals. Alternatively, the first terminal may send configuration information or indication information of the shared sidelink resource to other terminals in the group of terminals through the sidelink.

The cross-base station sidelink resource may further include a sidelink resource corresponding to each terminal in the group of terminals. The sidelink resource corresponding to each terminal in the group of terminals may be configured by the base station. The first base station directly sends, to the terminal, configuration information of the sidelink resource corresponding to the terminal, or the first terminal forwards the configuration information to each terminal. The sidelink resource corresponding to each terminal in the group of terminals may alternatively be configured by the first terminal. That is, after determining the cross-base station sidelink resource, the first terminal may allocate, to other terminals, sidelink resources corresponding to other terminals, and then send, to other terminals through the sidelink, configuration information of a sidelink resource corresponding to each of the other terminals.

In the foregoing embodiment, negotiation is performed between the first base station and the second base station, so as to resolve a problem that is of group communications resource configuration of a group of terminals and that exists when the group of terminals cross base stations, avoid group communications interference that exists when the group of terminals cross base stations or cells, and ensure continuity and stability of intra-group communication during cross-base station or cross-cell handover.

The method shown in FIG. 6 may be further applied to a scenario in which a group of terminals perform group communication across areas. In this scenario, a group of terminals may obtain, by using dedicated signaling or system information, an area-level sidelink resource that is valid in all cells in the first area for group communication. A configuration of the area-level sidelink resource may carry area information, that is, a valid range of the sidelink resource, for example, may be an area ID, or may be a cell ID list.

The cross-area sidelink resource may be considered as a sidelink resource that is valid in both the first area and the second area, that is, a group of terminals may perform group communication in the first area and/or the second area by using the cross-area sidelink resource.

Different from a scenario in which a group of terminals communicate with each other across base stations and across cells, in step S620, the first base station further needs to determine that the currently used second sidelink resource is unavailable in the second area, that is, step S621 in the dashed-line box. Other steps are the same as the scenario in which a group of terminals perform group communication across base stations, and details are not described herein again. The following describes in detail several possible implementations in which the first base station determines that the currently used second sidelink resource is unavailable.

For example, base stations in a same area need to learn whether a sidelink resource in the area-level sidelink resource has been used, so as to facilitate scheduling, but may not necessarily learn which terminal or which group of terminals uses/use each sidelink resource.

Therefore, in step S610, the first terminal may further carry, in the measurement report, configuration information of the area-level sidelink resource currently used by the group of terminals or the first terminal, where the configuration information may include information about cells or base stations in which the area-level sidelink resource is valid.

In step S621, after receiving the measurement report, the first base station may determine, based on area configuration information in the currently used area-level sidelink resource, that the area-level sidelink resource currently used by the first terminal is unavailable in the second area. The currently used area-level sidelink resource is a sidelink resource that is valid in coverage of a plurality of cells.

Optionally, a step of determining that a sidelink resource currently used by a group of terminals is unavailable in the second area may be further performed by the second base station. In this way, the second base station needs to obtain configuration information of the currently used sidelink resource, and the configuration information of the currently used sidelink resource may be carried by the first base station in the handover request in step S630 and sent to the second base station. When the second base station determines, based on the configuration information sent by the first base station, that the sidelink resource currently used by the first terminal or a group of terminals is unavailable in the second area, the handover request acknowledgment message in step S640 carries configuration information or indication information of the cross-area sidelink resource.

It should be understood that, valid cell or base station ranges of different area-level sidelink resources configured by a same base station may be different or may be the same. If valid cells or base station ranges of different area-level sidelink resources configured by a same base station are different, area configuration information of the current area-level sidelink resource needs to be provided to the base station. If valid cells or base station ranges of different area-level sidelink resources configured by a same base station are the same, when a group of terminals performs handover, the first base station and the second base station may determine, by pre-configuring area information, whether the handover crosses areas.

In a possible implementation, different terminals in the group of terminals may be handed over to a plurality of second base stations, and the plurality of second base stations all belong to the second area.

In this embodiment of this application, negotiation is performed between the first base station and the second base station, so as to resolve a problem that is of group communications resource configuration of a group of terminals and that exists when only a part of terminals are handed over to a new area in a movement process of the group of terminals, avoid group communications interference that exists when the group of terminals cross areas, and ensure continuity and stability of intra-group communication during cross-area handover.

The first sidelink resource (for example, the cross-cell sidelink resource, the cross-base station sidelink resource, or the cross-area sidelink resource) in this embodiment of this application may be used only when a group of terminals perform handover. After all terminals in the group of terminals complete handover or reselection, the first base station or the second base station may release the first sidelink resource, so that the first sidelink resource is used when another group of terminals perform handover.

Figure 7:
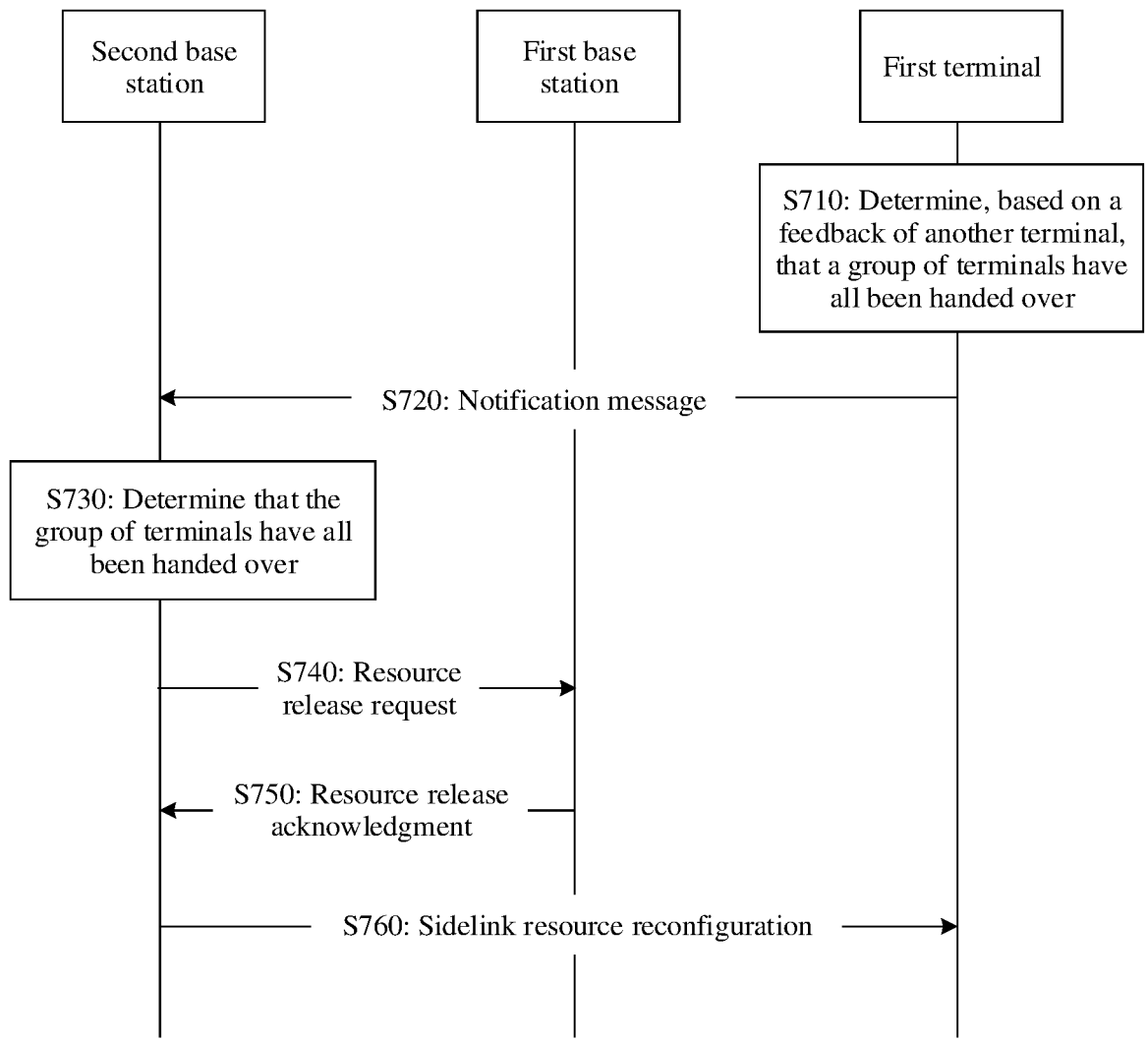
FIG. 7 is a schematic flowchart of a wireless network communications method according to still another embodiment of this application.

FIG. 7 is a schematic flowchart of a wireless network communications method according to an embodiment of this application. The method includes steps S710 to S760.

In step S710, a first terminal determines, based on a feedback from another terminal, that a group of terminals have been handed over.

In a possible implementation, after another terminal in the group of terminals is handed over or reselected to a new cell corresponding to the another terminal, one piece of feedback information may be sent to the first terminal, to indicate that each terminal in a connected state in the first terminal has been handed over to a new cell corresponding to the terminal, and/or each terminal in an idle state or an inactive state has been reselected to a new cell corresponding to the terminal. The first terminal may learn, from the feedback information, that the group of terminals have all been handed over.

Optionally, the another terminal may notify the first terminal by using one of a currently used sidelink resource, a sidelink resource negotiated between a first base station and a second base station, a default sidelink resource, or a pre-configured sidelink resource.

In step S720, the first terminal sends, to the second base station, a notification message indicating that the group of terminals are all handed over.

The notification message indicates that each terminal in a connected state in the group of terminals is handed over to a new cell corresponding to the terminal, and/or each terminal in an idle state or an inactive state in the group of terminals is reselected to a new cell corresponding to the terminal, where news cell corresponding to a plurality of terminals in the group of terminals belong to a same cell, a same base station, or a same cell set.

In other words, that the group of terminals are all handed over includes that a terminal in the connected state in the group of terminals is handed over to a new cell, a new base station, or a new area, and/or a terminal in the idle state or the inactive state is reselected to a new cell, a new base station, or a new area.

In step S730, the second base station determines that the group of terminals have all been handed over.

The second base station may learn, based on the notification message that is sent by the first terminal and that indicates that the group of terminals have all been handed over, that the group of terminals have all been handed over or reselected to a new cell corresponding to each terminal.

In step S740, the second base station sends, to the first base station, a request for releasing a first sidelink resource.

In step S750, the first base station sends a release acknowledgment message of the first sidelink resource to the second base station.

In step S760, the second base station reconfigures a sidelink resource for the group of terminals.

This step is an optional step. That the second base station reconfigures the sidelink resource for the group of terminals may be understood as that the second base station also releases the first sidelink resource.

For example, the sidelink resource reconfigured by the second base station may be a sidelink resource that is valid in a new cell, a new base station, or a new area.

In another implementation, the first base station may also determine that the first base station releases a sidelink resource used when a group of terminals are handed over to a new cell, a new base station, or a new area. For example, when obtaining a group identifier of the group of terminals, the first base station may determine, based on an identifier of each terminal in the group of terminals, whether the group of terminals are all handed over to a new cell, a range of a new base station, or a new area. Therefore, the first base station automatically releases the foregoing cross-cell sidelink resource, cross-base station sidelink resource, or cross-area sidelink resource.

In an example, the first base station may determine, based on an identifier of each terminal in a group of terminals, whether each terminal in a connected state is handed over to a new cell corresponding to the terminal, and/or determine whether each terminal in an idle state or an inactive state is reselected to a new cell corresponding to the terminal.

In another example, the first base station may determine, based on an identifier of each terminal in a group of terminals, whether each terminal in a connected state is handed over to a new cell corresponding to the terminal, and/or the first base station receives information that is sent by the first terminal and that indicates that each terminal in an idle state or an inactive state in a group of terminals completes cell reselection.

The second base station may further determine, in the following several possible manners, that the group of terminals has all been handed over or reselected.

For example, the first base station may forward group information of a group of terminals, for example, an identifier of each terminal in the group of terminals or a group identifier, to the second base station, and the second base station determines, based on the identifier of each terminal in the group of terminals, whether the group of terminals are all handed over or reselected. Alternatively, after determining in any one of the foregoing manners, the first base station may notify the second base station of a handover result indicating that the group of terminals have all been handed over or reselected.

In still another example, in a scenario in which a group of terminals perform group communication across areas, each terminal in the group of terminals may be handed over or reselected to a plurality of second base stations, and the plurality of second base stations all belong to a same area. After a plurality of terminals in the group of terminals are separately handed over or reselected to different second base stations in a new area, other terminals in the group of terminals may notify the first terminal, for example, head UE, and the head UE may determine, according to this, that each terminal in the group of terminals is handed over to a new area, and notify a corresponding second base station. The second base station may further notify a corresponding first base station, so that the original area and/or the new area release/releases a corresponding cross-area sidelink resource.

In this embodiment of this application, after each terminal in the group of terminals is handed over or reselected to a new cell corresponding to the terminal, a source base station or a new base station in which the terminal in the group of terminals is located may release a sidelink resource used for handover, so that the sidelink resource is used when another group of terminals perform handover. This improves utilization of the cross-cell/cross-base station/cross-area sidelink resource.

The foregoing describes in detail the method embodiments of the embodiments of this application with reference to FIG. 1 to FIG. 7. The following describes in detail apparatus embodiments of the embodiments of this application with reference to FIG. 8 to FIG. 13. It should be understood that, descriptions of the method embodiments correspond to descriptions of the apparatus embodiments. Therefore, for a part not described in detail, refer to the foregoing method embodiments.

Figure 8:
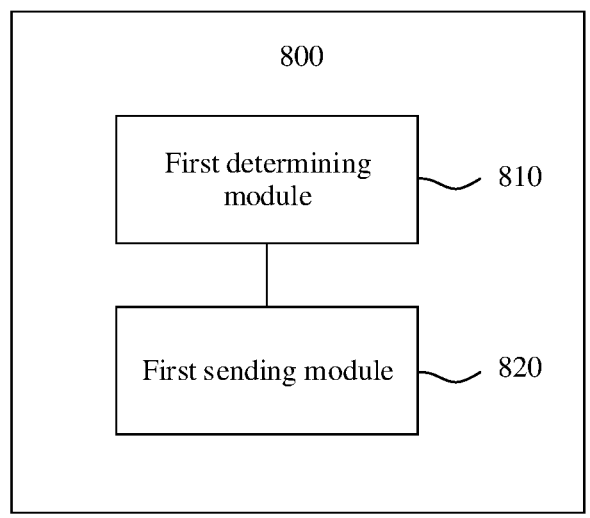
FIG. 8 is a schematic structural diagram of a base station according to an embodiment of this application.

FIG. 8 is a schematic structural diagram of a base station according to an embodiment of this application. The base station 800 in FIG. 8 may be the first base station mentioned above. The base station 800 may be configured to implement the foregoing steps performed by the first base station. The base station 800 includes a first determining module 810 and a first sending module 820.

The first determining module 810 is configured to determine that a first terminal in a first cell is handed over to a second cell, where the first terminal belongs to a group of terminals, and the first cell belongs to the base station 800.

The first sending module 820 is configured to send first information to the first terminal, where the first information indicates a first sidelink resource used by the group of terminals to perform communication, and the first sidelink resource is valid in both the first cell and the second cell.

Optionally, the base station 800 may further include a first receiving module, configured to: before the base station 800 determines that the first terminal in the first cell is handed over to the second cell, receive measurement result information sent by the first terminal, where the measurement result information includes a cell measurement result of a part or all of terminals in the group of terminals; and a first determining module, configured to determine, based on the measurement result information, whether each terminal in a connected state in the group of terminals can be handed over to a new cell corresponding to the terminal.

Optionally, the base station 800 may further include a second determining module, configured to determine, based on the measurement result information, whether each terminal in an idle state or an inactive state in the group of terminals can be reselected to a new cell corresponding to the terminal.

Optionally, the measurement result information includes a cell measurement result of each terminal in the group of terminals; and/or the measurement result information includes cell information of a cell, with best signal quality, corresponding to each terminal in the group of terminals.

Optionally, the measurement result information may be carried in a measurement report.

Optionally, the base station 800 may further include: a second receiving module, configured to: before the base station 800 determines that the first terminal in the first cell is handed over to the second cell, receive group handover information sent by the first terminal, where the group handover information is used to request the base station 800 to hand over each terminal in a connected state in the group of terminals to a new cell corresponding to the terminal and/or reselect each terminal in an idle state or an inactive state in the group of terminals to a new cell corresponding to the terminal, and new cells corresponding to a plurality of terminals in the connected state in the group of terminals belong to a same cell, a same base station, or a same cell set.

Optionally, the group handover information is carried in a group handover message or carried in a measurement report sent by the first terminal to the base station 800.

Optionally, the base station 800 may further include a second sending module, configured to send a handover command or a radio resource control reconfiguration message to each terminal in the connected state in the group of terminals.

Optionally, the base station 800 may further include a third sending module, configured to send reselection priority configuration information of each terminal in the idle state or the inactive state in the group of terminals to the first terminal; or the first base station sends reselection priority configuration information to each terminal in the idle state or the inactive state in the group of terminals.

Optionally, the base station 800 may further include an obtaining module, configured to obtain an identifier of each terminal in the group of terminals.

Optionally, the obtaining module is configured to receive the identifier that is sent by the first terminal and that is of each terminal in the group of terminals; or receive terminal information sent by each terminal in the group of terminals, where the terminal information includes a group identifier of a group to which the terminal belongs.

Optionally, the base station 800 may further include a negotiation module, configured to: before the base station 800 sends the first information to the first terminal, negotiate the first sidelink resource with a second base station.

Optionally, the negotiation module is configured to: send second information to the second base station, where the second information is used to request the second base station to configure a sidelink resource, or the second information is used to recommend a sidelink resource to the second base station; and/or receive third information sent by the second base station, where the third information includes configuration information of the first sidelink resource, or the third information is used to acknowledge the first sidelink resource.

Optionally, the second information includes valid duration of the sidelink resource recommended by the base station 800.

Optionally, the second information is carried in a handover request message, and/or the third information is carried in a handover request acknowledgment message.

Optionally, the base station 800 may further include a release module, configured to release the first sidelink resource after each terminal in the connected state in the group of terminals is handed over to the new cell corresponding to the terminal, and/or each terminal in the idle state or the inactive state in the group of terminals is reselected to the new cell corresponding to the terminal.

Optionally, the base station 800 may further include a third receiving module, configured to: before the base station 800 releases the first sidelink resource, receive a request, for releasing the first sidelink resource, sent by the second base station, where the second cell belongs to the second base station.

Optionally, the release module is configured to: determine, based on an identifier of each terminal in the connected state in the group of terminals, whether the terminal is handed over to a new cell corresponding to the terminal, where new cells corresponding to a plurality of terminals in the connected state in the group of terminals belong to a same cell, a same base station, or a same cell set; and/or receive information that is sent by the first terminal and that indicates that each terminal in the idle state or the inactive state in the group of terminals completes cell reselection, where new cells corresponding to a plurality of terminals in the idle state or the inactive state in the group of terminals belong to a same cell, a same base station, or a same cell set; and release the first sidelink resource after each terminal in the connected state in the group of terminals is handed over to a new cell corresponding to the terminal, and/or each terminal in the idle state or the inactive state in the group of terminals is reselected to a new cell corresponding to the terminal.

Optionally, the first sidelink resource is a sidelink resource that is valid only in the first cell and the second cell; the first sidelink resource is a sidelink resource that is valid in both the base station 800 and a second base station to which the second cell belongs; or the first sidelink resource is a sidelink resource that is valid in a first cell set and a second cell set, where the first cell set includes a plurality of cells including the first cell, and the second cell set includes a plurality of cells including the second cell.

Optionally, the base station 800 may further include a second determining module, configured to: before the base station 800 sends the first information to the first terminal, determine, based on configuration information of a second sidelink resource currently used by the group of terminals, that the second sidelink resource is unavailable in the second cell, where the second sidelink resource is a sidelink resource that is valid in coverage of a plurality of cells, and the configuration information of the second sidelink resource includes information indicating a valid range of the second sidelink resource.

Optionally, the base station 800 may further include a fourth sending module, configured to send configuration information of the first sidelink resource to each terminal in the group of terminals or send, to each terminal, configuration information of a sidelink resource that is in the first sidelink resource and that corresponds to the terminal.

Optionally, the first information is carried in a handover command or a radio resource control reconfiguration message.

Optionally, the first sidelink resource is a shared resource of the group of terminals; or the first sidelink resource includes the sidelink resource corresponding to each terminal in the group of terminals.

Optionally, the first information is configuration information of the first sidelink resource; or the first information is indication information that indicates the group of terminals to continue using the currently used sidelink resource.

Figure 9:
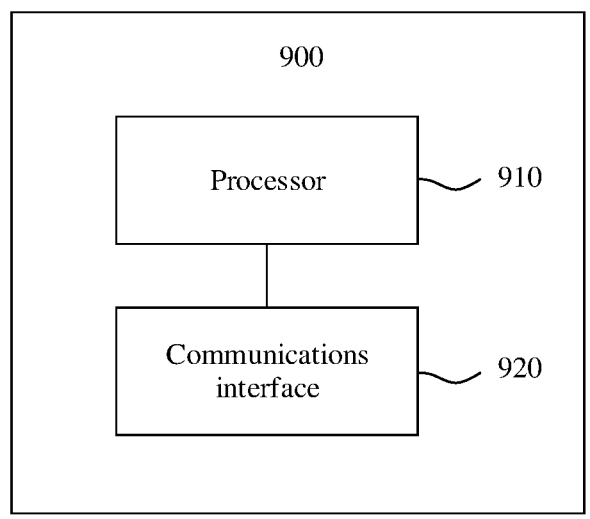
FIG. 9 is a schematic structural diagram of a communications apparatus according to an embodiment of this application.

FIG. 9 is a schematic structural diagram of a communications apparatus according to an embodiment of this application. The communications apparatus 900 shown in FIG. 9 may correspond to the first base station described above. The communications apparatus 900 may include at least one processor 910 and a communications interface 920. The communications interface 920 may be used by the communications apparatus 900 to exchange information with another communications apparatus. When program instructions are executed in the at least one processor 910, the communications apparatus 900 is enabled to implement the foregoing steps, methods, operations, or functions performed by the first base station.

Figure 10:
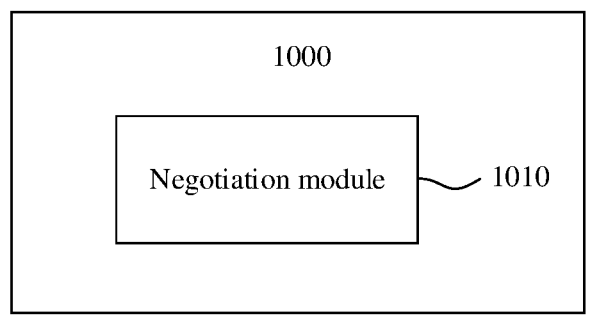
FIG. 10 is a schematic structural diagram of a base station according to another embodiment of this application.

FIG. 10 is a schematic structural diagram of a base station according to an embodiment of this application. The base station 1000 in FIG. 10 may be the second base station mentioned above. The base station 1000 may be configured to implement the foregoing steps performed by the second base station. The base station 1000 may include a negotiation module 1010.

The negotiation module 1010 is configured to: in a process in which a first terminal is handed over from a first cell to a second cell, negotiate a first sidelink resource with a first base station, where the first terminal belongs to a group of terminals, the first sidelink resource is used by the group of terminals to perform communication, and the first sidelink resource is valid in both the first cell and the second cell.

Optionally, the negotiation module 1010 may be configured to: receive second information sent by the first base station, where the second information is used to request the base station 1000 to configure a sidelink resource, or the second information is used to recommend a sidelink resource to the base station 1000; and/or send third information to the first base station, where the third information includes configuration information of the first sidelink resource, or the third information is used to acknowledge the first sidelink resource.

Optionally, the second information includes valid duration of the sidelink resource recommended by the first base station.

Optionally, the second information is carried in a handover request message, and/or the third information is carried in a handover request acknowledgment message.

Optionally, the base station 1000 may further include: a first receiving module, configured to receive a notification message sent by the first terminal, where the notification message indicates that each terminal in a connected state in the group of terminals has been handed over to a new cell corresponding to the terminal, and new cells corresponding to a plurality of terminals in the connected state in the group of terminals belong to a same cell, a same base station, or a same cell set; and/or the notification message indicates that each terminal in an idle state or an inactive state in the group of terminals has been reselected to a new cell corresponding to the terminal, and new cells corresponding to a plurality of terminals in the idle state or the inactive state in the group of terminals belong to a same cell, a same base station, or a same cell set; and a first sending module, configured to send, to the first base station, a request for releasing the first sidelink resource.

Optionally, the first sidelink resource is a sidelink resource that is valid only in the first cell and the second cell; the first sidelink resource is a sidelink resource that is valid in both the first base station and the base station 1000; or the first sidelink resource is a sidelink resource that is valid in a first cell set and a second cell set, where the first cell set includes a plurality of cells including the first cell, and the second cell set includes a plurality of cells including the second cell.

Optionally, the base station 1000 may further include: a second receiving module, configured to receive configuration information sent by the first base station, where the configuration information includes information indicating a valid range of a second sidelink resource currently used by the group of terminals, and the second sidelink resource is a sidelink resource that is valid in coverage of a plurality of cells; and a determining module, configured to determine, based on the configuration information, that the second sidelink resource is unavailable in the second cell.

Optionally, the base station 1000 may further include a configuration module, configured to: after each terminal in the connected state in the group of terminals has been handed over to a new cell corresponding to the terminal, and/or each terminal in the idle state or the inactive state in the group of terminals has been reselected to a new cell corresponding to the terminal, configure, for the group of terminals, a third sidelink resource that is valid in coverage of the base station 1000.

Optionally, the first sidelink resource is a shared resource of the group of terminals; or the first sidelink resource includes the sidelink resource corresponding to each terminal in the group of terminals.

Figure 11:
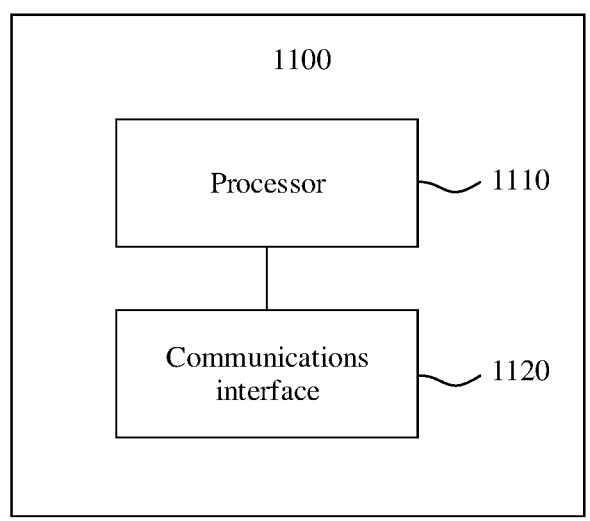
FIG. 11 is a schematic structural diagram of a communications apparatus according to another embodiment of this application.

FIG. 11 is a schematic structural diagram of a communications apparatus according to an embodiment of this application. The communications apparatus 1100 shown in FIG. 11 may correspond to the second base station described above. The communications apparatus 1100 may include at least one processor 1110 and a communications interface 1120. The communications interface 1120 may be used by the communications apparatus 1100 to exchange information with another communications apparatus. When program instructions are executed in the at least one processor 1110, the communications apparatus 1100 is enabled to implement the foregoing steps, methods, operations, or functions performed by the second base station.

Figure 12:
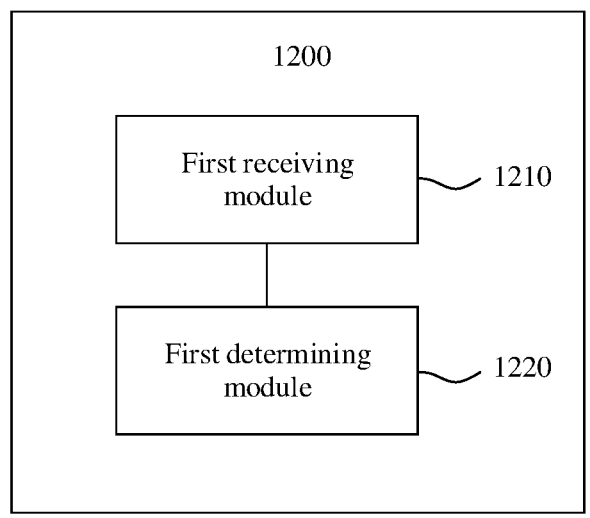
FIG. 12 is a schematic structural diagram of a terminal according to an embodiment of this application.

FIG. 12 is a schematic structural diagram of a terminal according to an embodiment of this application. The terminal 1200 in FIG. 12 may be the first terminal mentioned above. The terminal 1200 may be configured to implement the foregoing steps performed by the first terminal. The terminal 1200 includes a first receiving module 1210 and a first determining module 1220.

The first receiving module 1210 is configured to: in a process in which the terminal 1200 is handed over from a first cell to a second cell, receive first information sent by a first base station, where the terminal 1200 belongs to a group of terminals, and the first information indicates a first sidelink resource used by the group of terminals to perform communication, and the first sidelink resource is valid in both the first cell and the second cell.

The first determining module 1220 is configured to determine the first sidelink resource based on the first information.

Optionally, the terminal 1200 may further include: an obtaining module, configured to: before the terminal 1200 receives the first information sent by the first base station, obtain a cell measurement result of a part or all of terminals in the group of terminals; and a first sending module, configured to send measurement result information to the first base station, where the measurement result information includes the cell measurement result of the part or all of the terminals.

Optionally, the measurement result information includes a cell measurement result of each terminal in the group of terminals; and/or the measurement result information includes cell information of a cell, with best signal quality, corresponding to each terminal in the group of terminals.

Optionally, the terminal 1200 may further include: a determining module, configured to: before the terminal 1200 receives the first information sent by the first base station, determine, based on a cell measurement result of each terminal in a connected state in the group of terminals, whether the terminal can be handed over to a new cell corresponding to the terminal, where new cells corresponding to a plurality of terminals in the connected state in the group of terminals belong to a same cell, a same base station, or a same cell set; and/or the first terminal determines, based on a cell measurement result of each terminal in an idle state or an inactive state in the group of terminals, whether the terminal can be reselected to a new cell corresponding to the terminal, where new cells corresponding to a plurality of terminals in the idle state or the inactive state in the group of terminals belong to a same cell, a same base station, or a same cell set; and a second sending module, configured to send group handover information to the first base station when it is determined that each terminal in the connected state in the group of terminals can be handed over to the new cell corresponding to the terminal, and/or each terminal in the idle state or the inactive state in the group of terminals can be reselected to the new cell corresponding to the terminal, where the group handover information is used to request the first base station to hand over each terminal in the connected state in the group of terminals to the new cell corresponding to the terminal, and/or request the first base station to send reselection priority configuration information to the first terminal or each terminal in the idle state or the inactive state in the group of terminals.

Optionally, the group handover information is carried in a group handover message or carried in a measurement report sent by the terminal 1200 to the first base station.

Optionally, the terminal 1200 may further include a third sending module, configured to send cell priority configuration information to each terminal in the idle state or the inactive state in the group of terminals.

Optionally, the terminal 1200 may further include: a fourth sending module, configured to send an identifier of each terminal in the group of terminals to the first base station; or send terminal information of the terminal 1200 to the first base station, where the terminal information includes a group identifier of a group to which the terminal 1200 belongs.

Optionally, the terminal 1200 may further include: a receiving module, configured to receive feedback information sent by each of other terminals in the group of terminals, where the feedback information is used to indicate whether the terminal has been handed over or reselected to a new cell corresponding to the terminal.

Optionally, the first sidelink resource is a sidelink resource that is valid only in the first cell and the second cell; the first sidelink resource is a sidelink resource that is valid in both the first base station and the second base station; or the first sidelink resource is a sidelink resource that is valid in a first cell set and a second cell set, where the first cell set includes a plurality of cells including the first cell, and the second cell set includes a plurality of cells including the second cell.

Optionally, the terminal 1200 may further include a fifth sending module, configured to: before the terminal 1200 receives the first information sent by the first base station, send configuration information to the first base station, where the configuration information includes information indicating a valid range of a second sidelink resource currently used by the group of terminals, and the second sidelink resource is a sidelink resource that is valid in coverage of a plurality of cells.

Optionally, the terminal 1200 may further include a sixth sending module, configured to send configuration information of the first sidelink resource to each of other terminals in the group of terminals; or send, to each of other terminals in the group of terminals, configuration information of a sidelink resource that is in the first sidelink resource and that corresponds to the terminal.

Optionally, the terminal 1200 may further include a configuration module, configured to: before the terminal 1200 sends, to each of other terminals in the group of terminals, the configuration information of the sidelink resource that is in the first sidelink resource and that corresponds to the terminal, separately configure a corresponding sidelink resource for each of other terminals based on the first sidelink resource.

Optionally, the first sidelink resource is a shared resource of the group of terminals; or the first sidelink resource includes the sidelink resource corresponding to each terminal in the group of terminals.

Optionally, the terminal 1200 sends, to each of other terminals in the group of terminals by using a target sidelink resource, configuration information corresponding to the terminal. The target sidelink is one of the first sidelink resource, the currently used second sidelink resource, a default sidelink resource, or a pre-configured sidelink resource.

Figure 13:
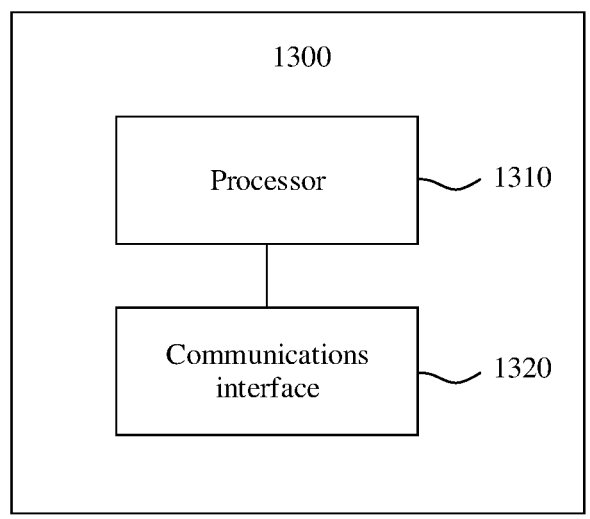
FIG. 13 is a schematic structural diagram of a communications apparatus according to still another embodiment of this application.

FIG. 13 is a schematic structural diagram of a communications apparatus according to an embodiment of this application. The communications apparatus 1300 shown in FIG. 13 may correspond to the first terminal described above. The communications apparatus 1300 may include at least one processor 1310 and a communications interface 1320. The communications interface 1320 may be used by the communications apparatus 1300 to exchange information with another communications apparatus. When program instructions are executed in the at least one processor 1310, the communications apparatus 1300 is enabled to implement the foregoing steps, methods, operations, or functions performed by the second base station.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless network communications method, comprising:
   determining, by a first base station, that a first terminal in a first cell is handed over to a second cell, wherein the first terminal belongs to a group of terminals, and the first cell belongs to the first base station; and
   sending, by the first base station, first information to the first terminal, wherein the first information indicates a first sidelink resource used by the group of terminals to perform communication, and the first sidelink resource is valid in both the first cell and the second cell;
   wherein before the determining, by the first base station, that the first terminal in the first cell is handed over to the second cell, the method further comprises:
   receiving, by the first base station, group handover information sent by the first terminal, wherein the group handover information is used to request the first base station to hand over each terminal in a connected state in the group of terminals to a new cell corresponding to the terminal and/or reselect each terminal in an idle state or an inactive state in the group of terminals to the new cell corresponding to the terminal, and new cells corresponding to a plurality of terminals in the group of terminals belong to a same cell, a same base station, or a same cell set, and
   wherein the group handover information indicates a determination made on whether to perform group handover of the group of terminals.

2. The method according to claim 1, wherein before the determining, by the first base station, that the first terminal in the first cell is handed over to the second cell, the method further comprises:
   receiving, by the first base station, measurement result information sent by the first terminal, wherein the measurement result information comprises a cell measurement result of a part or all of terminals in the group of terminals.

3. The method according to claim 2, wherein the determining, by the first base station, that the first terminal in the first cell is handed over to the second cell comprises:
   determining, by the first base station based on the measurement result information, whether each terminal in a connected state in the group of terminals can be handed over to the new cell corresponding to the terminal; and/or
   determining, by the first base station based on the measurement result information, whether each terminal in an idle state or an inactive state in the group of terminals can be reselected to the new cell corresponding to the terminal.

4. The method according to claim 1, further comprising:
   sending, by the first base station, a handover command or a radio resource control reconfiguration message to each terminal in the connected state in the group of terminals.

5. A wireless network communications method, comprising:
   in a process in which a first terminal is handed over from a first cell to a second cell, receiving, by the first terminal, first information sent by a first base station, wherein the first terminal belongs to a group of terminals, and the first information indicates a first sidelink resource used by the group of terminals to perform communication, and the first sidelink resource is valid in both the first cell and the second cell; and
   determining, by the first terminal, the first sidelink resource based on the first information;
   wherein before the receiving, by the first terminal, of the first information sent by the first base station, the method further comprises: sending, by the first terminal, group handover information to the first base station, wherein the group handover information is used to request the first base station to hand over each terminal in a connected state in the group of terminals to a new cell corresponding to the terminal, and/or request the first base station to send reselection priority configuration information to the first terminal or each terminal in an idle state or an inactive state in the group of terminals; and
   wherein before the sending of the group handover information to the first base station, the method further comprises:
   collecting, by the first terminal, measurement information from each other terminal in the group of terminals; and
   determining, by the first terminal, the group handover information to be sent to the first base station based on the collected measurement information.

6. The method according to claim 5, wherein before the receiving, by the first terminal, of the first information sent by the first base station, the method further comprises:
    obtaining, by the first terminal, a cell measurement result of a part or all of terminals in the group of terminals; and
    sending, by the first terminal, measurement result information to the first base station, wherein the measurement result information comprises the cell measurement result of the part or all of the terminals.

7. The method according to claim 5, wherein before the receiving, by the first terminal, of the first information sent by the first base station, the method further comprises:
    determining, by the first terminal based on a cell measurement result of each terminal in the connected state in the group of terminals, whether the terminal can be handed over to the new cell corresponding to the terminal, wherein new cells corresponding to a plurality of terminals in the connected state in the group of terminals belong to a same cell, a same base station, or a same cell set; and/or
    determining, by the first terminal based on a cell measurement result of each terminal in the idle state or the inactive state in the group of terminals, whether the terminal can be reselected to the new cell corresponding to the terminal, wherein new cells corresponding to a plurality of terminals in the idle state or the inactive state in the group of terminals belong to a same cell, a same base station, or a same cell set; and
    wherein the sending, by the first terminal, of the group handover information to the first base station is performed as a result of a determination that each terminal in the connected state in the group of terminals can be handed over to the new cell corresponding to the terminal, and/or each terminal in the idle state or the inactive state in the group of terminals can be reselected to the new cell corresponding to the terminal.

8. The method according to claim 5, further comprising:
    sending, by the first terminal, cell priority configuration information to each terminal in the idle state or the inactive state in the group of terminals.

9. The method according to claim 5, further comprising:
    sending, by the first terminal, an identifier of each terminal in the group of terminals to the first base station; or
    sending, by the first terminal, terminal information of the first terminal to the first base station, wherein the terminal information comprises a group identifier of a group to which the first terminal belongs.

10. A base station, comprising:
    at least one processor, and a memory storing instructions for execution by the at least one processor;
    wherein, when executed, the instructions cause the base station to perform operations comprising:
    determining that a first terminal in a first cell is handed over to a second cell, wherein the first terminal belongs to a group of terminals, and the first cell belongs to the base station; and
    sending first information to the first terminal, wherein the first information indicates a first sidelink resource used by the group of terminals to perform communication, and the first sidelink resource is valid in both the first cell and the second cell; and
    wherein before the determining that the first terminal in the first cell is handed over to the second cell, the operations further comprise: receiving group handover information sent by the first terminal, wherein the group handover information is used to request the base station to hand over each terminal in a connected state in the group of terminals to a new cell corresponding to the terminal and/or reselect each terminal in an idle state or an inactive state in the group of terminals to the new cell corresponding to the terminal, and new cells corresponding to a plurality of terminals in the group of terminals belong to a same cell, a same base station, or a same cell set, and
    wherein the group handover information indicates a determination made on whether to perform group handover of the group of terminals.

11. The base station according to claim 10, wherein the operations further comprises:
    before the determining that the first terminal in the first cell is handed over to the second cell, the method further comprises:
    receiving measurement result information sent by the first terminal, wherein the measurement result information comprises a cell measurement result of a part or all of terminals in the group of terminals.

12. The base station according to claim 11, wherein the operations further comprises:
    wherein the determining that the first terminal in the first cell is handed over to the second cell comprises:
    determining based on the measurement result information, whether each terminal in a connected state in the group of terminals can be handed over to the new cell corresponding to the terminal; and/or
    determining based on the measurement result information, whether each terminal in an idle state or an inactive state in the group of terminals can be reselected to the new cell corresponding to the terminal.

13. The base station according to claim 10, wherein the operations further comprises:
    sending a handover command or a radio resource control reconfiguration message to each terminal in the connected state in the group of terminals.

14. A terminal, comprising:
    at least one processor, and a memory storing instructions for execution by the at least one processor;
    wherein, when executed, the instructions cause the terminal to perform operations comprising:
    in a process in which the terminal is handed over from a first cell to a second cell, receiving first information sent by a first base station, wherein the terminal belongs to a group of terminals, and the first information indicates a first sidelink resource used by the group of terminals to perform communication, and the first sidelink resource is valid in both the first cell and the second cell; and
    determining the first sidelink resource based on the first information;
        wherein before the receiving of the first information sent by the first base station, the operations further comprise: sending group handover information to the first base station, wherein the group handover information is used to request the first base station to hand over each terminal in a connected state in the group of terminals to a new cell corresponding to the terminal, and/or request the first base station to send reselection priority configuration information to the terminal or each terminal in an idle state or an inactive state in the group of terminals, and
        wherein the terminal is configured to perform further operations before the sending of the group handover information to the first base station, the method further comprises:

collecting, by the first terminal, measurement information from each other terminal in the group of terminals; and determining, by the first terminal, the group handover information to be sent to the first base station based on the collected measurement information.

15. The terminal according to claim 14, wherein before the receiving of the first information sent by the first base station, the operations further comprises:

obtaining a cell measurement result of a part or all of terminals in the group of terminals; and sending measurement result information to the first base station, wherein the measurement result information comprises the cell measurement result of the part or all of the terminals.

16. The terminal according to claim 14, wherein before the receiving of the first information sent by the first base station, the operations further comprises:

determining based on a cell measurement result of each terminal in the connected state in the group of terminals, whether the terminal can be handed over to the new cell corresponding to the terminal, wherein new cells corresponding to a plurality of terminals in the connected state in the group of terminals belong to a same cell, a same base station, or a same cell set; and/or determining based on a cell measurement result of each terminal in the idle state or the inactive state in the group of terminals, whether the terminal can be reselected to the new cell corresponding to the terminal, wherein new cells corresponding to a plurality of terminals in the idle state or the inactive state in the group of terminals belong to a same cell, a same base station, or a same cell set; and wherein the sending of the group handover information to the first base station is performed as a result of a determination that each terminal in the connected state in the group of terminals can be handed over to the new cell corresponding to the terminal, and/or each terminal in the idle state or the inactive state in the group of terminals can be reselected to the new cell corresponding to the terminal.

17. The terminal according to claim 14, wherein the operations further comprises:

sending cell priority configuration information to each terminal in the idle state or the inactive state in the group of terminals.

18. The terminal according to claim 14, wherein the operations further comprises:

sending an identifier of each terminal in the group of terminals to the first base station; or sending terminal information of the terminal to the first base station, wherein the terminal information comprises a group identifier of a group to which the terminal belongs.

* * * * *

UNITED STATES PATENT AND TRADEMARK OFFICE
CERTIFICATE OF CORRECTION

| | | |
|---|---|---|
| PATENT NO. | : 12,035,181 B2 | |
| APPLICATION NO. | : 17/351400 | |
| DATED | : July 9, 2024 | |
| INVENTOR(S) | : Junren Chang et al. | |

It is certified that error appears in the above-identified patent and that said Letters Patent is hereby corrected as shown below:

In the Claims

At Column 40, Line 38, please amend Claim 14 as follows:
14. A terminal, comprising:
    at least one processor, and a memory storing instructions for execution by the at least one processor;
    wherein, when executed, the instructions cause the terminal to perform operations comprising:
    in a process in which the terminal is handed over from a first cell to a second cell, receiving first information sent by a first base station, wherein the terminal belongs to a group of terminals, and the first information indicates a first sidelink resource used by the group of terminals to perform communication, and the first sidelink resource is valid in both the first cell and the second cell; and
    determining the first sidelink resource based on the first information;
    wherein before the receiving of the first information sent by the first base station, the operations further comprise: sending group handover information to the first base station, wherein the group handover information is used to request the first base station to hand over each terminal in a connected state in the group of terminals to a new cell corresponding to the terminal, and/or request the first base station to send reselection priority configuration information to the terminal or each terminal in an idle state or an inactive state in the group of terminals, and
    wherein the terminal is configured to perform further operations before the sending of the group handover information to the first base station, and the further operations comprise:
    collecting, by the terminal, measurement information from each other terminal in the group of terminals; and
    determining, by the terminal, the group handover information to be sent to the first base station based on the collected measurement information.

Signed and Sealed this
Sixth Day of August, 2024

Katherine Kelly Vidal
*Director of the United States Patent and Trademark Office*